US010578852B2

(12) United States Patent
Watson et al.

(10) Patent No.: US 10,578,852 B2
(45) Date of Patent: Mar. 3, 2020

(54) SURGICAL STEREOSCOPIC VISUALIZATION SYSTEM WITH MOVABLE HEAD MOUNTED DISPLAY

(71) Applicants: Robert D. Watson, Thousand Oaks, CA (US); James R. Watson, Santa Rosa, CA (US)

(72) Inventors: Robert D. Watson, Thousand Oaks, CA (US); James R. Watson, Santa Rosa, CA (US)

( * ) Notice: Subject to any disclaimer, the term of this patent is extended or adjusted under 35 U.S.C. 154(b) by 64 days.

(21) Appl. No.: 15/588,198

(22) Filed: May 5, 2017

(65) Prior Publication Data

US 2017/0322410 A1    Nov. 9, 2017

Related U.S. Application Data

(60) Provisional application No. 62/332,453, filed on May 5, 2016, provisional application No. 62/332,454, filed on May 5, 2016.

(51) Int. Cl.
*G02B 21/36* (2006.01)
*H04N 13/254* (2018.01)
(Continued)

(52) U.S. Cl.
CPC ....... *G02B 21/368* (2013.01); *G02B 21/0012* (2013.01); *G02B 21/22* (2013.01); *G02B 21/365* (2013.01); *G02B 27/0172* (2013.01); *G02B 27/0176* (2013.01); *G06T 19/006* (2013.01); *H04N 13/239* (2018.05); *H04N 13/254* (2018.05); *H04N 13/344* (2018.05); *G02B 2027/014* (2013.01);
(Continued)

(58) Field of Classification Search
CPC .... G02B 2027/0134; G02B 2027/0138; G02B 2027/0156; G02B 27/0176; G02B 2027/014; G02B 2027/0169; G02B 21/22; G02B 21/0012; G02B 27/0172; G02B 21/365; G02B 21/368; G06T 19/006; H04N 13/344; H04N 13/254
See application file for complete search history.

(56) References Cited

U.S. PATENT DOCUMENTS 5,321,416 A   6/1994   Bassett et al.
5,867,210 A   2/1999   Rod
(Continued)

*Primary Examiner* — Philip P. Dang
(74) *Attorney, Agent, or Firm* — Craig M. Stainbrook; Stainbrook & Stainbrook, LLP

(57) ABSTRACT

A surgical stereoscopic visualization system having a microscope head, dual cameras mounted on or proximate the microscope head for real time video capture of a subject in an operative field, a video processing and display system to receive separate video streams from the cameras and to combine the separate video streams into a time-aligned stereoscopic image. The processed image is displayed on a matrix display screen in at least one movable head-mounted stereoscopic display. Movement of the head mounted display is accomplished with a support structure on a headband that accurately positions the display screen in front of the user's eyes, yet allows the user to precisely move the display screen either manually or by motorized means into and out of the user's line of sight, thereby facilitating uninterrupted use of the hands while working in the surgical suite.

12 Claims, 22 Drawing Sheets

(51) Int. Cl.
  *H04N 13/344* (2018.01)
  *H04N 13/239* (2018.01)
  *G02B 21/00* (2006.01)
  *G02B 21/22* (2006.01)
  *G02B 27/01* (2006.01)
  *G06T 19/00* (2011.01)

(52) U.S. Cl.
  CPC ............... *G02B 2027/0134* (2013.01); *G02B 2027/0138* (2013.01); *G02B 2027/0156* (2013.01); *G02B 2027/0169* (2013.01)

(56) References Cited

U.S. PATENT DOCUMENTS

| | | |
|---|---|---|
| 6,955,444 B2 | 10/2005 | Gupta |
| 7,710,647 B2 | 5/2010 | Takahashi |
| 7,774,044 B2 | 8/2010 | Sauer et al. |
| 8,049,873 B2 | 11/2011 | Hauger et al. |
| 8,358,330 B2 | 1/2013 | Riederer |
| 8,467,133 B2 * | 6/2013 | Miller .................. G02B 27/017 353/28 |
| 8,882,662 B2 * | 11/2014 | Charles ................. A61B 17/02 600/214 |
| 9,046,688 B2 | 6/2015 | Hoegele |
| 9,402,539 B2 | 8/2016 | Buckland |
| 9,448,407 B2 * | 9/2016 | Kimura .............. G02B 27/0172 |
| 9,462,944 B2 | 10/2016 | Moeller et al. |
| 9,507,155 B2 | 11/2016 | Morimoto |
| 9,542,958 B2 * | 1/2017 | Sendai .................... G10L 21/10 |
| 10,210,670 B2 * | 2/2019 | Yamazaki ............... G09G 3/002 |
| 2004/0119867 A1 * | 6/2004 | Nishioka ............ H04N 5/23212 348/333.01 |
| 2009/0227847 A1 | 9/2009 | Tepper et al. |
| 2015/0018622 A1 * | 1/2015 | Tesar ....................... A61B 1/05 600/202 |
| 2015/0124072 A1 | 5/2015 | Wei et al. |
| 2015/0272694 A1 * | 10/2015 | Charles ................... A61B 1/32 600/202 |
| 2016/0007849 A1 * | 1/2016 | Krueger ................. A61B 3/113 600/301 |
| 2016/0070105 A1 * | 3/2016 | Tannoudiji ........... G02B 27/017 345/8 |
| 2017/0020627 A1 * | 1/2017 | Tesar ...................... A61B 90/20 |

\* cited by examiner

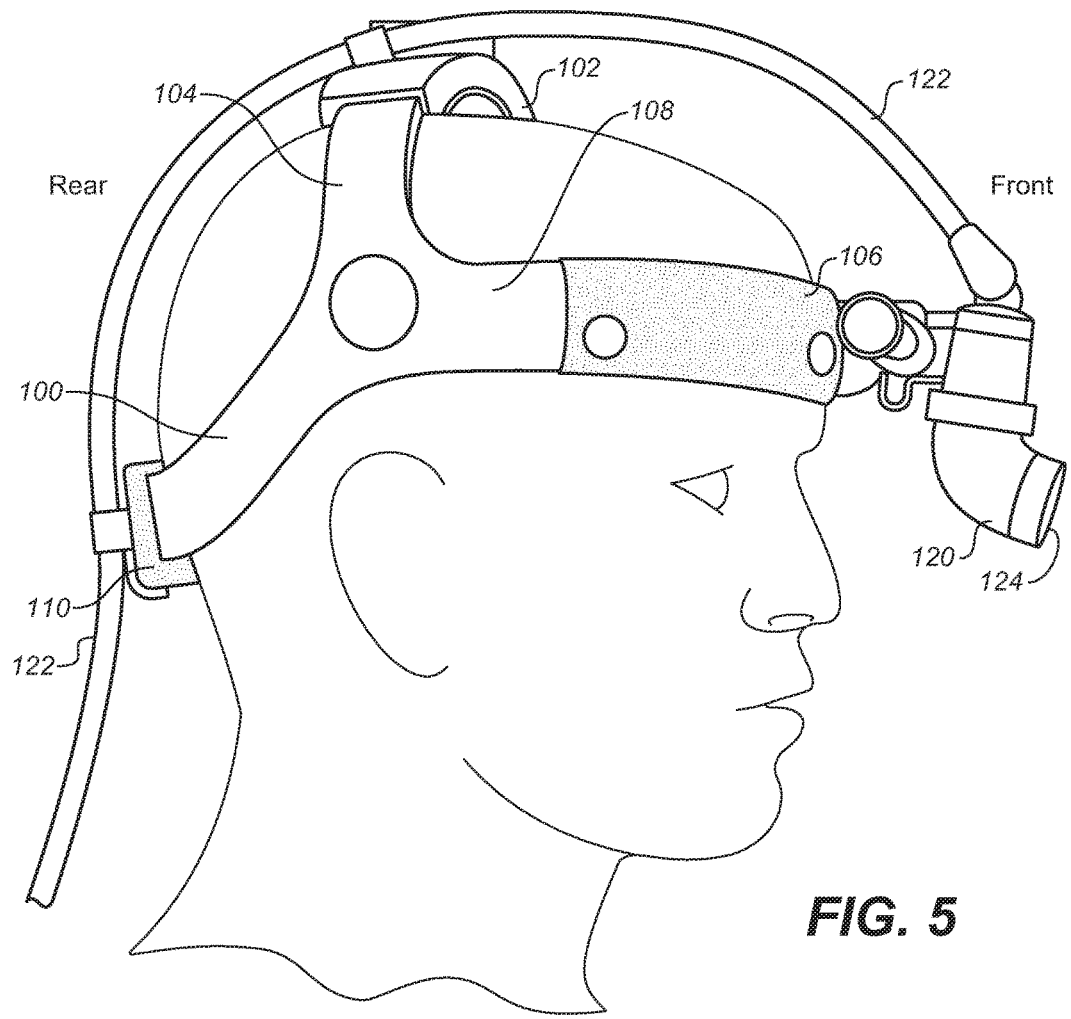
FIG. 5
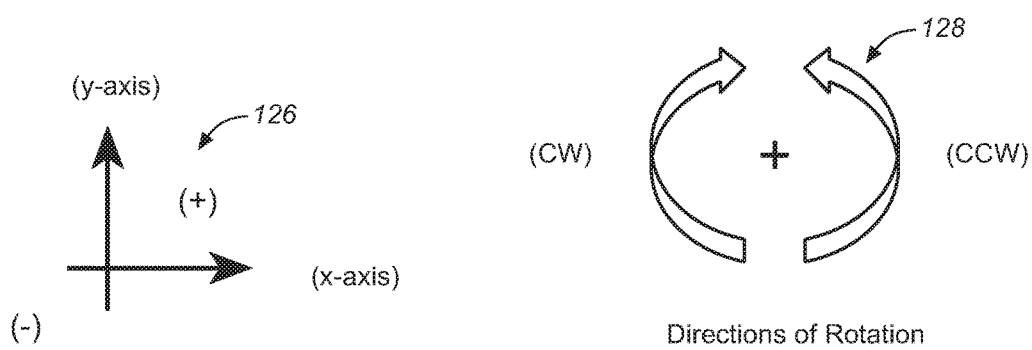
FIG. 6A  FIG. 6B

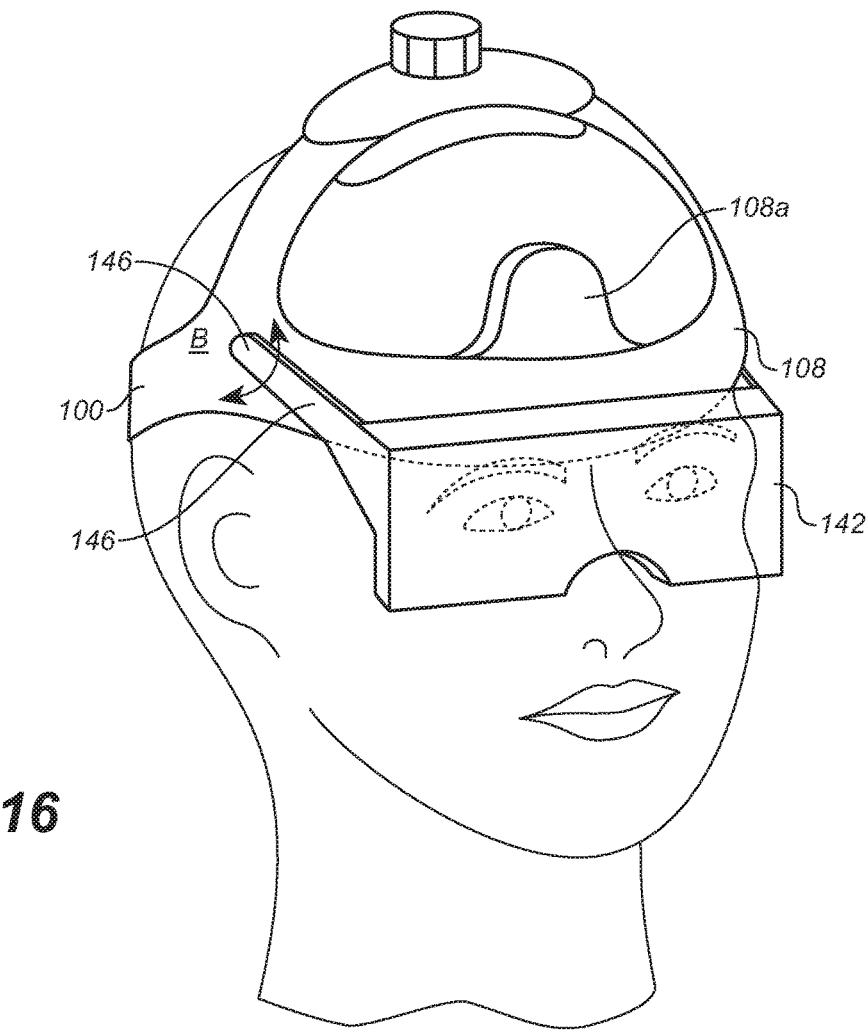
FIG. 16
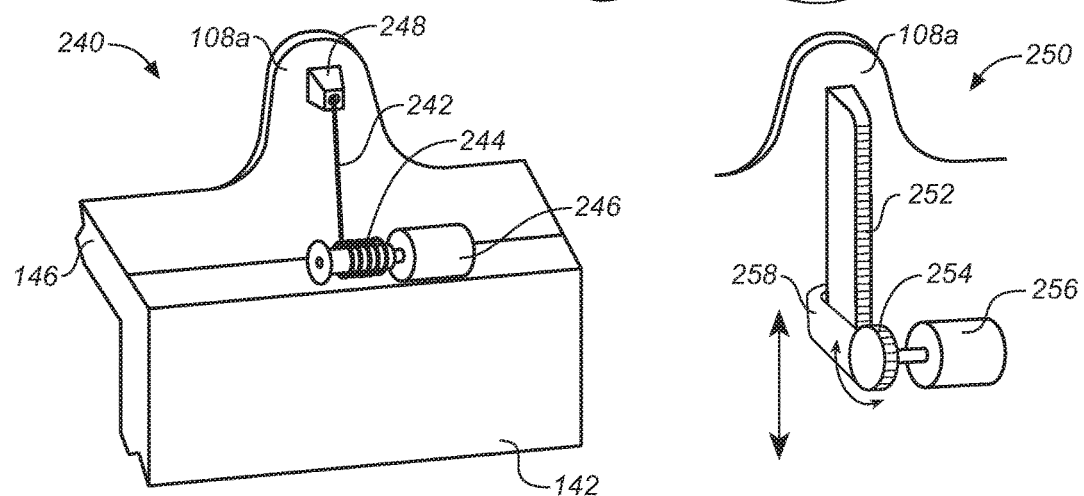
FIG. 16A  FIG. 16B

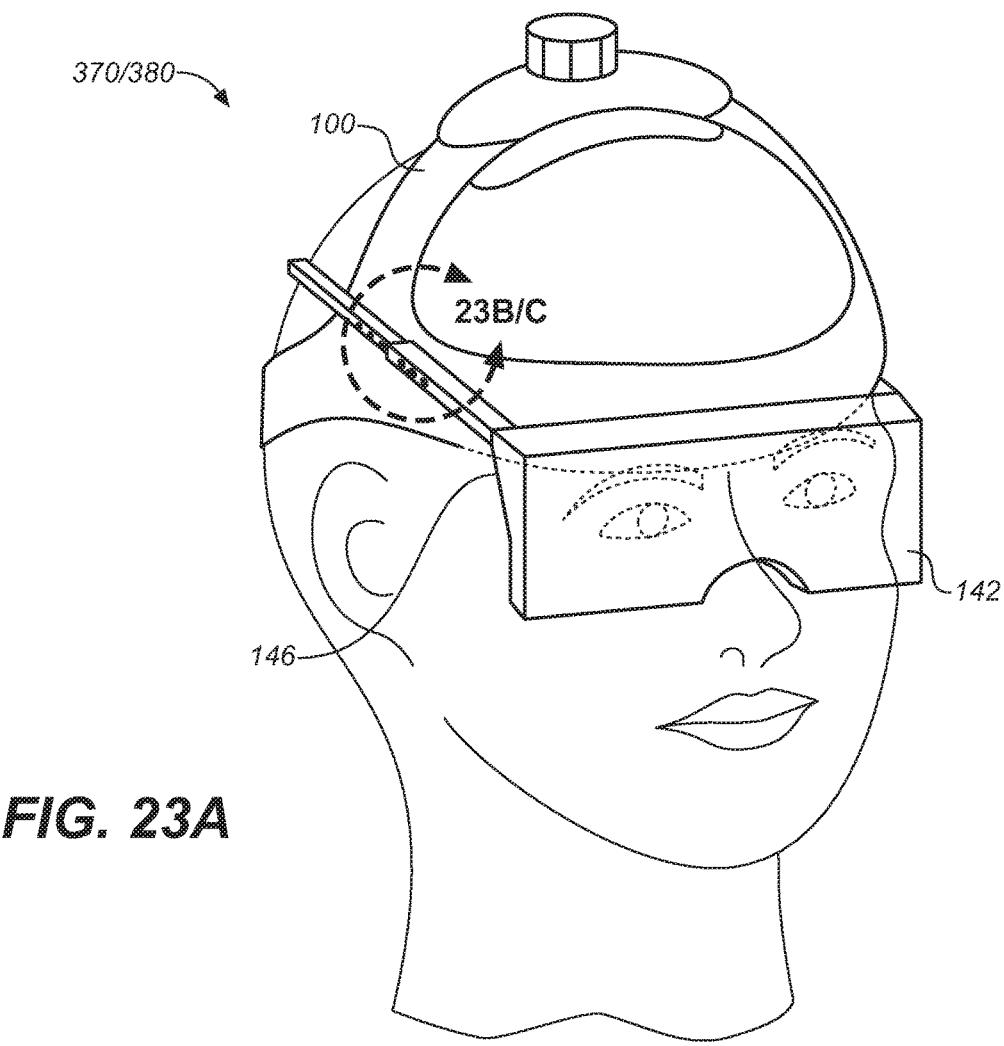
FIG. 23A
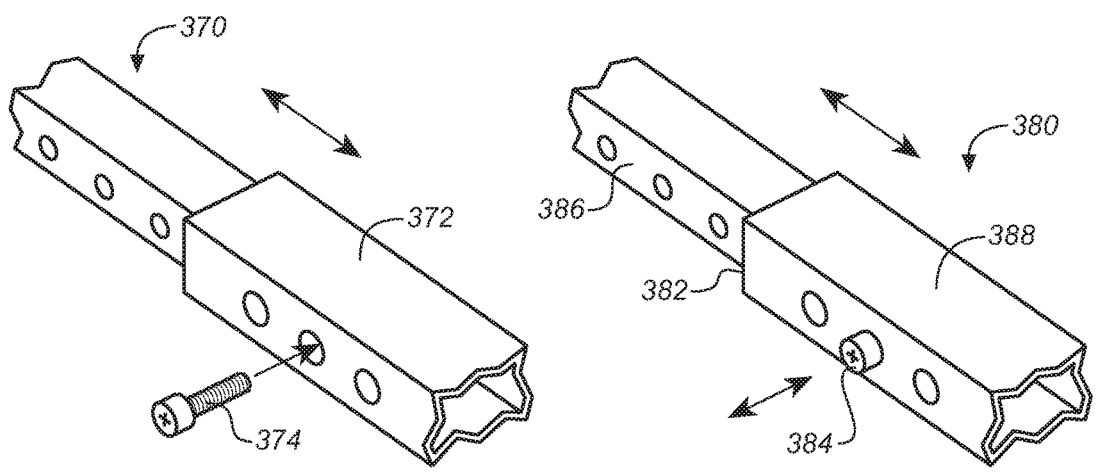
FIG. 23B  FIG. 23C

SURGICAL STEREOSCOPIC VISUALIZATION SYSTEM WITH MOVABLE HEAD MOUNTED DISPLAY

CROSS REFERENCES TO RELATED APPLICATIONS

The present application claims the benefit of U.S. Provisional Patent Application Ser. Nos. 62/332,453 and 62/332,454, each of which was filed May 5, 2016 (May 5, 2016), and each of which is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates generally to surgical vision systems and methods, and more particularly to a surgical stereo vision system and method for microsurgery that enables a direct, head-mounted stereoscopic visualization of a surgical field of view. The system provides augmented real-time processed stereoscope vision to the head mounted display. The system further incorporates a movable stereoscopic head mount display for the display which allows the user to rapidly move the display screens away from and then back into the user's line of sight.

Background Discussion

Microsurgery demands a distortion-free magnified stereoscopic view of the operating field. Surgical loupes, surgical light microscopes (SLMs), and the digital implementation of SLMs in digital stereo microscopes (DSMs) provide such views of the operating field. FIG. 1 is a schematic view illustrating an exemplary prior art SLM/DSM system 10.

SLMs have a number of optical elements that provide magnification, working distance, and distortion correction. SLMs include an objective lens 12 for collecting the light 14 from the subject in the surgical field 16, a pair of oculars 18 for viewing the subject, and a number of optical elements 20 which enhance the view through magnification and correction of distortion. SLMs improve on the classical double-barreled binocular microscope by addressing problems with distortion, limited working distance, limited field of view, and brightness. To increase magnification, either an objective lens is changed or zoom lens system 22 is moved. The pair of oculars 18 provides views having the required parallax to the right and left eye. SLMs provide instant stereo view for depth perception to the human visual system.

Digital Stereo Microscopes (DSMs) utilize components identical with SLM optical components but supplement the ocular lenses with video capture devices (e.g., cameras) 24a, 24b for display on remote monitors or digital recording. Operating fields provided through visual aids such as SLMs, DSMs and surgical loupes may allow a user to perform bi-manual microsurgical manipulations with the subject/objects in the operating field and optionally sharing the operating field with one or more collaborators.

Current SLMs employ multiple articulating stereoscopic eye pieces so that a primary surgeon and an assistant using the system can simultaneously visualize the operative field. During a surgical procedure, the microscope head 26 is placed over the operative area for the best visualization possible. This placement, however, is limited by the requirement for direct physical access to the surgical area and for the ability of the surgeon and assistant to physically view the operative field via the eyepieces. Improper alignment of the viewer's head with respect to the eyepieces can undermine a proper stereoscopic image. In addition, physical placement of the surgical microscope head to maximize the view for the surgeon often leads to a sub-optimal view for the assistant, because they are typically on opposite sides of the surgical microscope head and consequently have opposing view constraints. Further, protracted surgical procedures lasting several hours may require the surgeon and the assistant to assume and maintain uncomfortable and abnormal body positions to visualize the surgical field via the stereoscopic eyepieces, and this leads to fatigue, suboptimal surgical performance, and prolonged operating times.

The addition of digital cameras 24a, 24b and video processing 28 in DSMs have expanded the options for display of the surgical field of view. Current DSMs can utilize a 3D-enabled television or screen 30 with or without special glasses for viewing the 3D content. These methods of display, however, are not ideal for intraoperative use because they suffer from several drawbacks. For instance, video screens displaying 3D images without active shutter glasses (alternate frame sequencing glasses) suffer color distortion and depth of field distortion. Even with shutter glasses the video screen must be positioned away from the surgical field to facilitate access to the surgical field. Because hand-eye coordination is lost with constant head motion, this prevents the simultaneous visualization of the magnified and unmagnified surgical field necessary during complex bi-manual hand movements.

Head mounted displays gesture in the direction of a solution. However, more broadly and generally available head mounted displays (HMDs) are generally worn merely as a way to enhance the virtual reality experience for the user and encapsulate the user's eyes. As such they are typically utilized in a "constant use" manner and are only manually removed at the end of an event (e.g., a game or the like). Thus, they are not configured for rapidly changing from viewing the display content to directly viewing the "real" visual field. Although this works well for entertainment purposes, it is disadvantageous for users requiring a method to easily and accurately move the display screen in and out of the line of sight, which is precisely the challenge faced by many surgeons at work in the operating room.

There are many circumstances in which a person working with both hands needs the ability to transition from a close field of view to their immediate surroundings. Surgeons viewing a microscopically enhanced view of a patient's surgical site frequently need to look at a patient's vital signs, to reference CT images, or to communicate with others in the area (verbally or nonverbally). Often during surgical procedures the necessity of maintaining a sterile field precludes the operator from touching anything nonsterile. This particular situation requires a "hands free" method for moving a display screen out from in front of a user's eyes and the ability to accurately reposition the display screen back to its original viewing position. Other examples include microscopic surgery, microscopic assembly, dental surgery, immersive virtual reality games, etc. Each of these would greatly benefit from the movable display system of the present invention.

BRIEF SUMMARY OF THE INVENTION

The present invention replaces the stereo eyepiece assembly on the microscope head, as the primary visualization device, with a lightweight, high-resolution, head-mounted stereoscopic visual display with a rapidly movable head-mounted display. The succinct summary below broadly sets out the more important features of the present invention to facilitate a better understanding of the following detailed description and the advances made by the present invention over existing art.

It is a first and principal object and advantage of the surgical stereoscopic visualization system of the present invention to provide a new and improved surgical stereoscopic visualization system configured to facilitate optimal positioning of a stereoscopic microscope head regardless of the physical position of the surgeon or surgeon's assistant.

It is a further object and advantage of the present invention to obviate the need for a surgeon and surgeon's assistant to be physically proximate a needed surgical microscope.

Yet another object and advantage of the present invention is to ensure a constant stereoscopic image allowing a surgeon and his/her assistant to view the surgical area in a comfortable, head neutral position.

A still further object and advantage of the present invention is to employ a stereoscopic head-mounted-display so as to provide an aligned and focused stereoscopic video image.

In an embodiment, and in its most essential aspect, the inventive surgical stereoscopic visualization system includes a surgical stereoscopic visualization system having a microscope head, dual cameras mounted on or proximate the microscope head for real time video capture of a subject in an operative field, a video processing and display system to receive separate video streams from the cameras and to combine the separate video streams into a time-aligned stereoscopic image. The processed image is displayed on a matrix display screen in at least one movable head-mounted stereoscopic display. Movement of the head mounted display is accomplished with a support structure on a headband that accurately positions the display screen in front of the user's eyes, yet allows the user to precisely move the display screen either manually or by motorized means into and out of the user's line of sight, thereby facilitating uninterrupted use of the hands while working in the surgical suite.

The present invention also solves the problem of accurately moving the display screen in and out of the user's line of sight using either manual or electromechanical means. Recent technological advances in miniature electromechanical components make it possible to control the precise movements needed to accurately move the display screen and return the display screen to the original location. The electromechanical method incorporates a remote switch, activated by the user, to raise and lower the display screen as needed. This remote switch can be covered with a sterile barrier or placed in a location on the user that can be activated by something other than the user's hands (e.g., hip, elbow, etc.) or even by another person outside of the sterile field.

Thus, yet another object and advantage of the present invention is to provide a head mounted display screen that is activated manually and incorporates controlled positioning and a positive locking mechanism for moving and securing the display screen into either a raised or a lowered position. This is especially advantageous for use by surgeons conducting microsurgical procedures.

Another object and advantage of the present invention is to provide a head mounted display screen that is repositioned electromechanically and activated by a remote switch. This method also incorporates controlled positioning and positive locking into either a raised or a lowered position.

A still further object and advantage of the present invention is to provide a head mounted display screen repositioned by alternative electromechanical methods and activated by a remote switch. Safety measures in case of a power failure incorporate a control system that positions the display screen(s) in either a raised or a lowered position in the case of a power failure. In case of emergency, total removal may be preferred.

Another object and advantage of the present invention is to provide a method of counterbalancing the weight of the display screen to reduce user fatigue and disorientation during user head movements due to the unbalanced front weighted display screen apparatus.

Another object and advantage, while not exhausting the list, is to provide a head mounted display screen that is adjustable to fit the needs of the various users' anatomies.

In an embodiment, these objectives and advantages are achieved by providing a head mounted display assembly having a display screen to display images to the user which is positioned in front of the user's eyes and which can be manually positioned in various positions including a completely raised position, a position out of the user's line of sight, or a position lowered to align the screen with the user's line of sight.

In an alternative embodiment, the objectives are achieved by providing a head mounted display assembly having a display screen to display images to the user which is positioned in front of the user's eyes and can be electromechanically positioned in various positions including completely raised, out of the user's line of sight, or lowered to align the screen with the user's line of sight with the use of a remote switch to initiate the movement of the display screen assembly.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, it is to be understood that the disclosure is not limited in its application to the details of the construction and the arrangements set forth in the following description or illustrated in the drawings. The inventive apparatus described herein is capable of other embodiments and of being practiced and carried out in various ways.

For a better understanding of the present invention, its advantages and the specific objects attained by its uses, reference should be made to the accompanying drawings and descriptive matter in which there are illustrated the preferred embodiments.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 5 is a right side perspective view showing the headband of FIG. 4 with an attached lighting system and power cable or fiber optic cable.

FIG. 6A is a schematic view defining the axis convention (terminology) applicable to display motions as described herein.

FIG. 6B is a schematic defining the direction of rotation of the embodiments of the display described herein.

FIG. 16 is an upper front right perspective view showing how the headband may be modified to mount various electromechanical means for pivotally moving the temples and display screen CCW and CW around pivot points at the temple tips, as shown in FIGS. 16A and 16B, wherein the head mounted display pivots at the temple tips.

FIG. 16A is an upper front right perspective view showing a motorized cable and winch mechanism for actuating pivot movement about the pivot point.

FIG. 16B is the same view showing how a motorized rack and pinion gear assembly can be similarly employed.

FIG. 23A is an upper right front perspective view showing the headband and display screen assembly with telescoping temples.

FIG. 23B is a detailed view taken along section line 23B/C-23B/C illustrating an embodiment of a telescoping temple.

FIG. 23C is a detailed view taken along section line 23B/C-23B/C illustrating another embodiment of a telescoping temple.

DETAILED DESCRIPTION OF THE INVENTION

Figure 1:
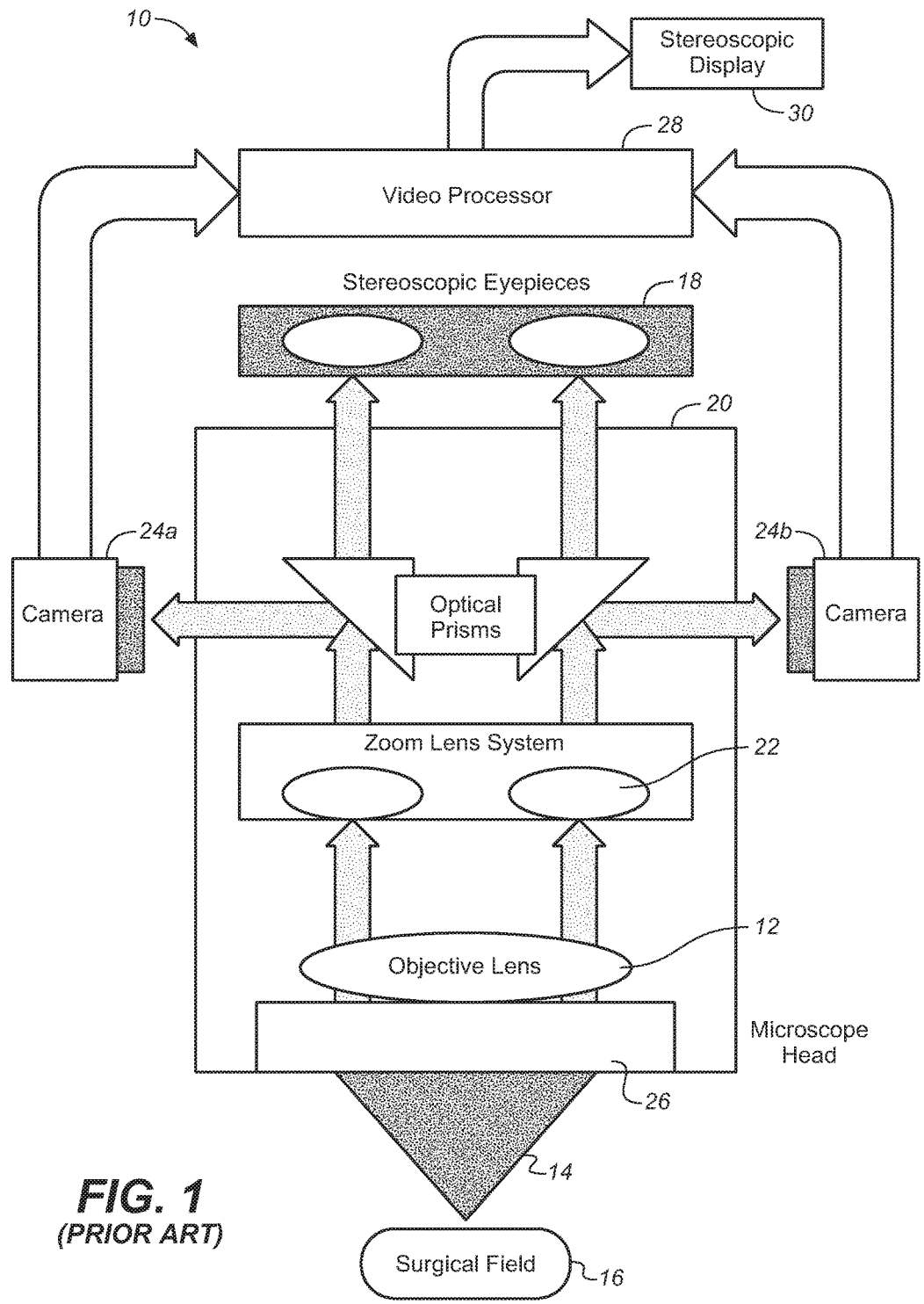
FIG. 1 is a schematic view showing a prior art surgical light microscope/digital stereo microscope.
Figure 2:
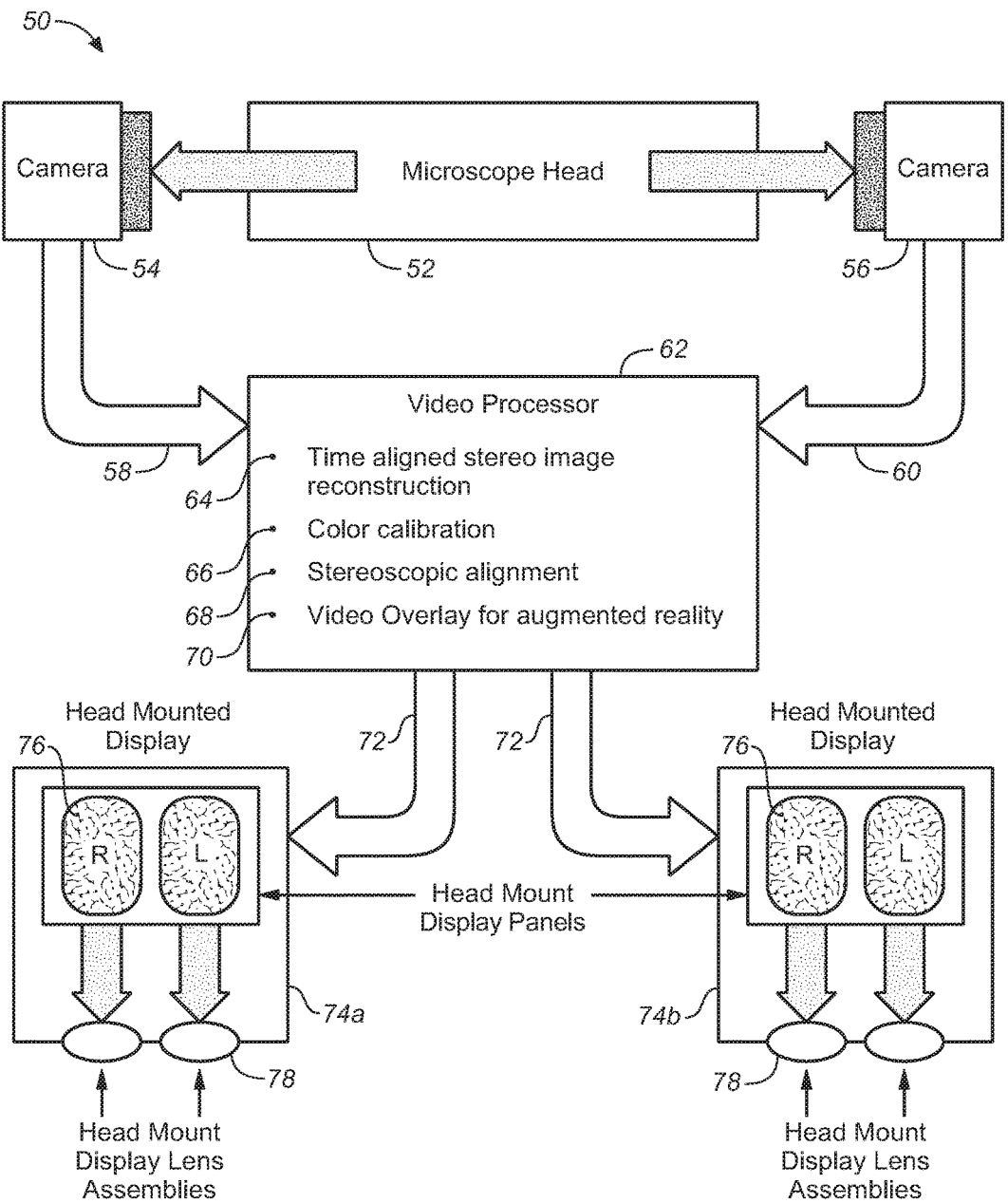
FIG. 2 is a schematic view illustrating the surgical stereoscopic visualization device of the present invention.

Referring now to FIG. 2, the stereoscopic visualization system of the present invention 50 eliminates the physical barriers to an optimal placement of the microscope head 52 for surgical procedures. Surgical head eyepieces are replaced with dual high speed, high resolution cameras 54, 56 for real time video capture. FIG. 2 shows the video processing and display features of the invention system. The high resolution video streams 58, 60 are processed by a centrally located real time video processing system 62. The real time video processing of the surgical field allows for the combination of the separate video streams into a time aligned stereoscopic image. During the video processing of the incoming video streams, including reconstruction of a time-aligned stereo image 64, color calibration 66, and stereoscopic alignment 68, additional visual information can also be overlaid onto the stereoscopic video stream to provide an augmented visual reality 70.

Upon completion of video processing, the video processing system 62 outputs and transmits a stereoscopic video stream signal 72 coupled to displays. The displays may be in wired or wireless connection with the video processing system, the latter coupling accomplished using any of a number of suitable wireless LAN communications protocols, preferably using spread spectrum techniques. The wired connection may be preferred for display of the processed video stream on a central stereoscopic display (not shown) for non-surgical staff; and the wireless signal is preferred for transmission to multiple high resolution head mounted displays 74a, 74b for at least the primary surgeon and assistant and others actively involved in attending to a patient in the surgical procedure.

Each head mounted display 74, 74b (and et seq.) consists of a miniature high resolution and high speed display 76 coupled with near field optical lens assembly 78 for proper focusing of the image on the viewers' pupils. Each channel of the stereoscopic video stream is displayed on a distinct portion of the display to actualize the stereoscopic visual separation. A novel head-mounted display suitable for use in the presently inventive system is described in U.S. Provisional Patent Application Ser. No. 62/332,453, entitled Movable Head Mounted Display System, filed concurrently on this date, naming as inventors the inventors of the system described herein, and incorporated in its entirety by reference herein.

Figure 3A:
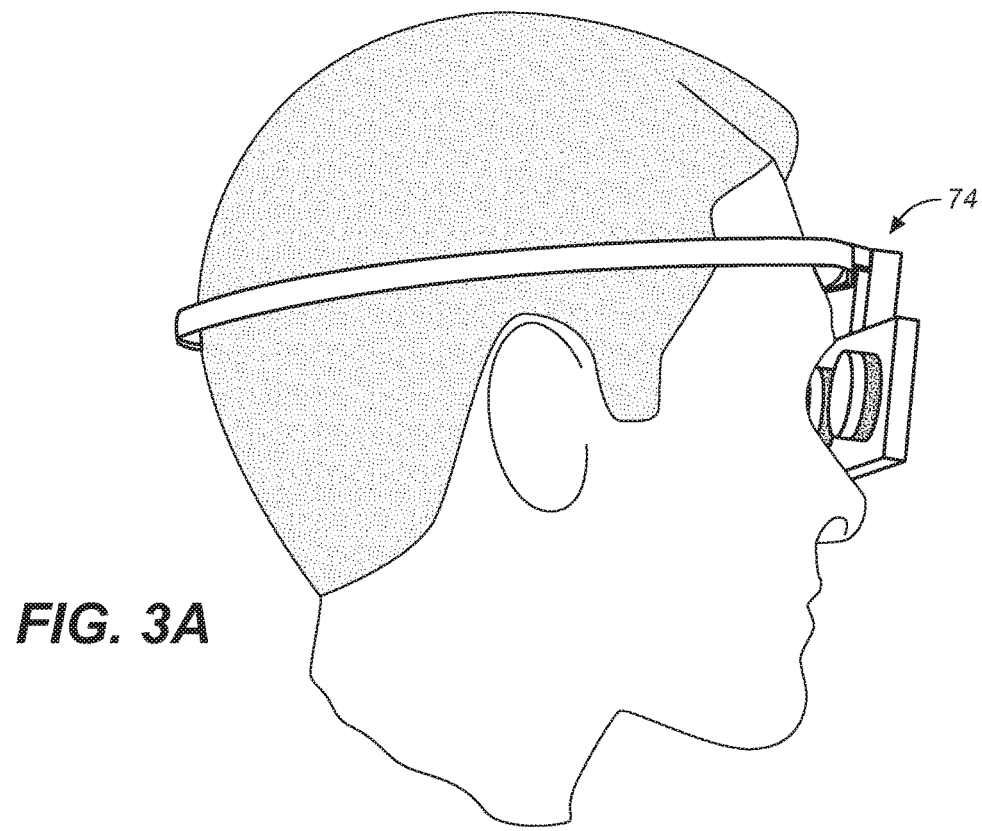
FIG. 3A is a lower right rear side perspective view showing an embodiment of a display panel for the present invention, in this instance an adjustable head-mounted display panel implemented as LCD glasses.
Figure 3B:
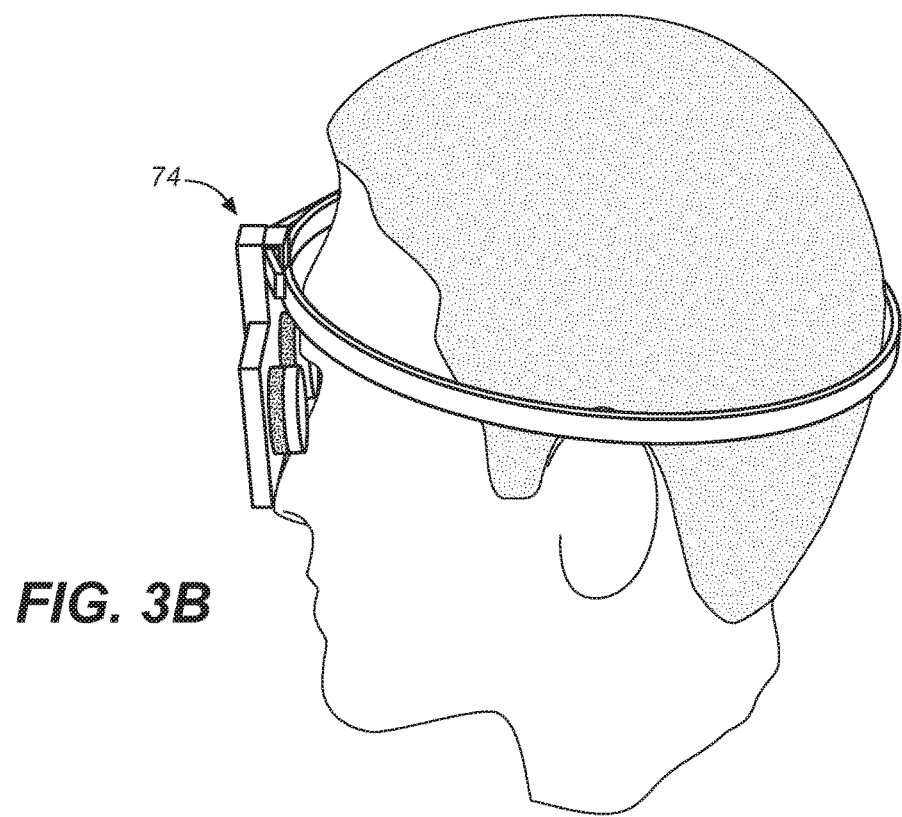
FIG. 3B is an upper left side perspective view thereof.

FIGS. 3A and 3B show that the display panel and lens assembly 74 are fabricated in a semi-open fashion to facilitate the simultaneous viewing of both magnified and unmagnified visual fields to enhance hand-eye coordination.

The following paragraphs provide detail relating to embodiments of the head-mounted display for use in the present invention. The general term "motor" is employed throughout, and as used herein, the term means describes, but is not limited to, common interchangeable motor types, such as DC, reduced gearhead, gearmotor, planetary, servo, and stepper motors. The general term "switch" is used to describe, but is not limited to, common interchangeable types such as momentary, toggle, contact, touchpad and voice activated switches throughout this document.

As used herein, the general term "gear" is used to describe, but is not limited to, common interchangeable types of gears, such as spur, helical, bevel, rack and pinion, or worm gears throughout this document.

Referring next to FIGS. 4 through 23C, wherein like reference numerals refer to like components in the various views, there is illustrated therein a new and improved head mounted display screen ("HMD") 140.

Electrical controls (switches, buttons, etc.) for the electromechanical systems can be located in several places depending upon the desired configuration. Typical (but non-limiting) locations include: on the headband assembly 100, on a strap on the inside of the users' arm, on a belt on the users' hip, or external to the user (for activation by another person). Even a voice-activated interface may be used in place of a physical switch.

The power sources (battery or utility supplied) and cable routing methods are varied depending upon the desired configuration. The power battery may be located either on the headband, belt, or externally away from the user and connected to electromechanical components via cabling. To minimize user fatigue, system weight may be reduced as much as possible. Thus, the power source and control system may be placed in a belt pack with lightweight cabling to the back of the headband assembly 100, which also counteracts the weight of the display screen 142.

The motion control methods described throughout this document may be based upon a variety of electronic programmable devices such as, but not limited to, programmable logic controllers (PLC), single board computers (SBC), personal computers of remote computer servers. In addition manual motion control using simple limit switches and a manually rotated motor reversal switch or any permutation thereof. The motor(s) may be synchronized via encoder positioning, limit switches and/or through PLC programming.

Figure 4:
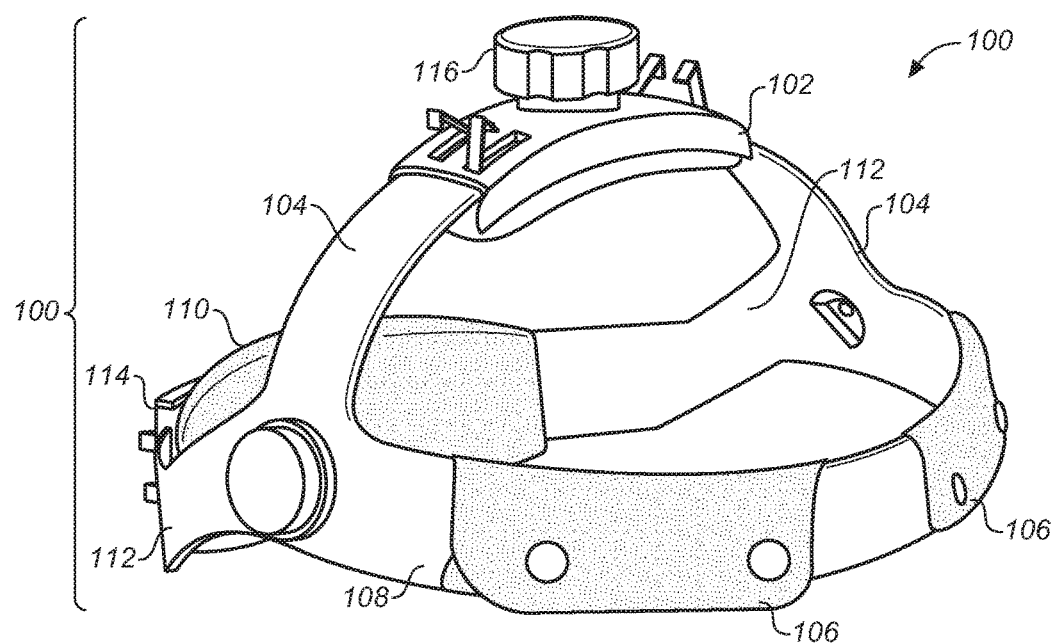
FIG. 4 is an upper left rear perspective view showing a typical adjustable headband used for attaching microscope loupes or a lighting system.

FIG. 4 illustrates a typical adjustable headband assembly 100 used for attaching microscope loupes or a lighting system for use in surgery. The headband assembly 100 includes several components, including a top pad 102 disposed on a top band 104, forehead pads 106, disposed on a forehead band 108, a rear head band 110 disposed on a rear head band 112, and two rotating adjustment knobs, including a rear head band adjustment knob 114 (not seen in the view) located at or near the center of the rear head strap, and a top band adjustment knob 116 located at or near the center of the top band. Both adjustment knobs either tighten or loosen the headband length to better fit an individual user's head size, in a manner well known in the art.

FIG. 5 illustrates a headband assembly 100 shown with an attached lighting system 120 and power cable or fiber optic cable 122 as typically used during surgery in a hospital's operating room. The headband assembly 100 and lighting system 120 allow the operator to work with both hands while the lamp 124 pivotally mounted on the forehead band 108 illuminates the region directly ahead. Keeping both hands within the sterile field is especially important during surgery to maintain patient safety and prevent infection.

FIG. 6A defines the x-y axis convention 126 (terminology) applicable to display motions as described herein. FIG. 6B defines the direction of rotation convention 128 for clockwise/counterclockwise ("CW/CCW") rotation of the display referred to herein.

Figure 7:
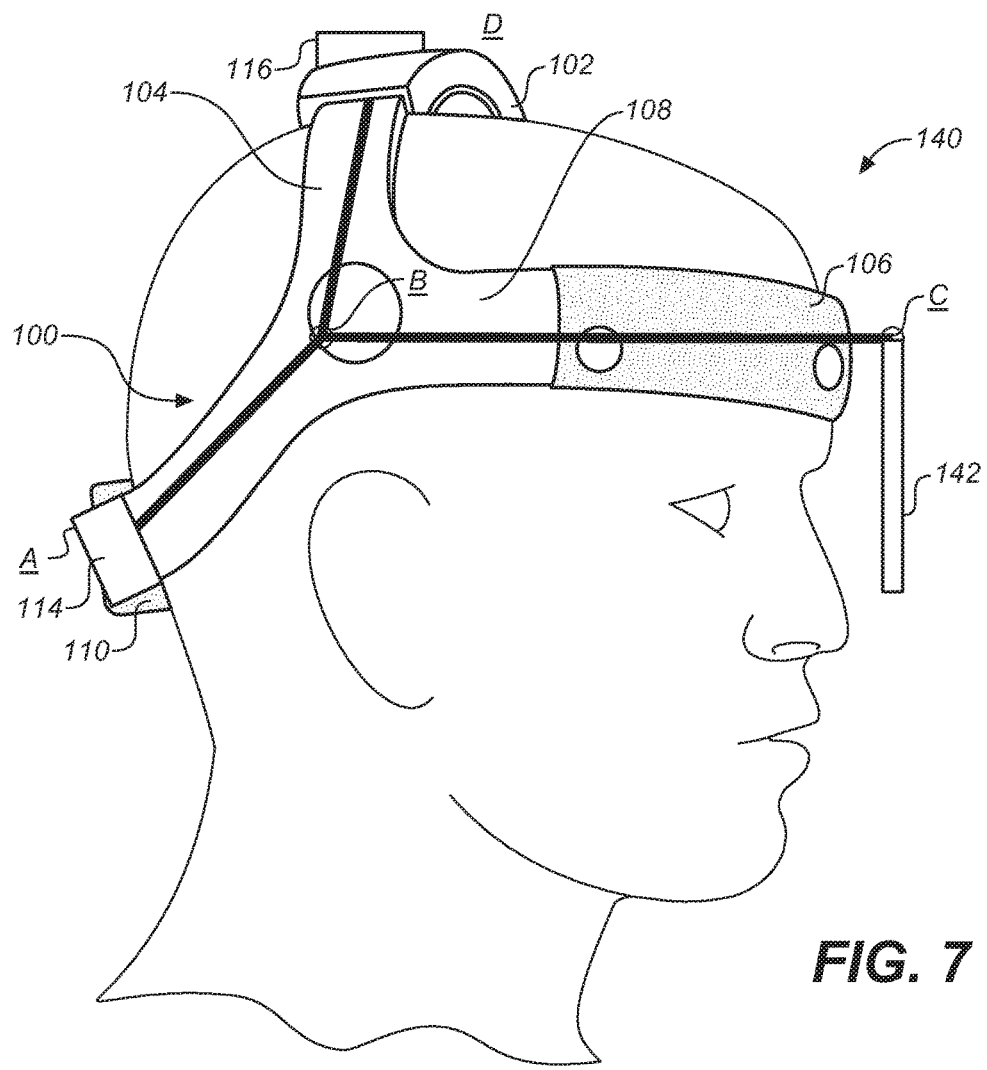
FIG. 7 is a right side perspective view identifying and defining the location reference points (A, B, C, and D) used in the detailed description herein.

FIG. 7 defines the location reference points (A, B, C, and D) variously used herein to identify structural locations and positions within the body of this document. For illustrative purposes only, the display screen 142 does not show additional components incorporated into the apparatus, such as the surrounding viewing guards (e.g., a screening skirt), integrated circuit boards, mounting boards, side support structures, cabling, etc., which would typically be present in a working configuration.

Figure 8:
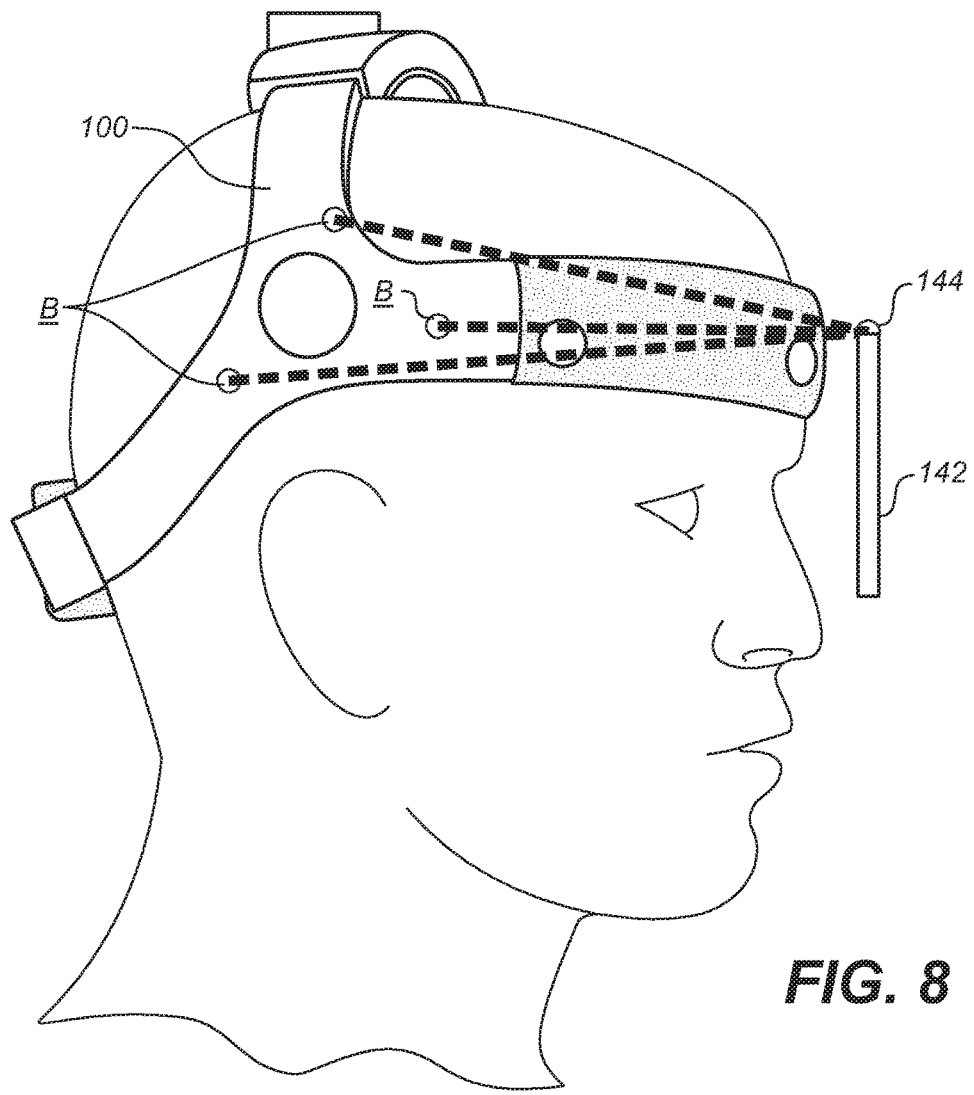
FIG. 8 is the same view showing that pivot point (B) as defined in FIG. 7 may be above, horizontally in-line, or below the display screen top height or altitude.

FIG. 8 shows schematically the headband assembly with a pivoting head mounted display 140, showing that a pivot point B may be located above, horizontally in-line with, or below the display screen top edge or altitude 144, when the display is in the viewing position. Pivot point B may be located anywhere feasible on the headband depending upon the mechanical apparatus or system utilized.

Figure 9:
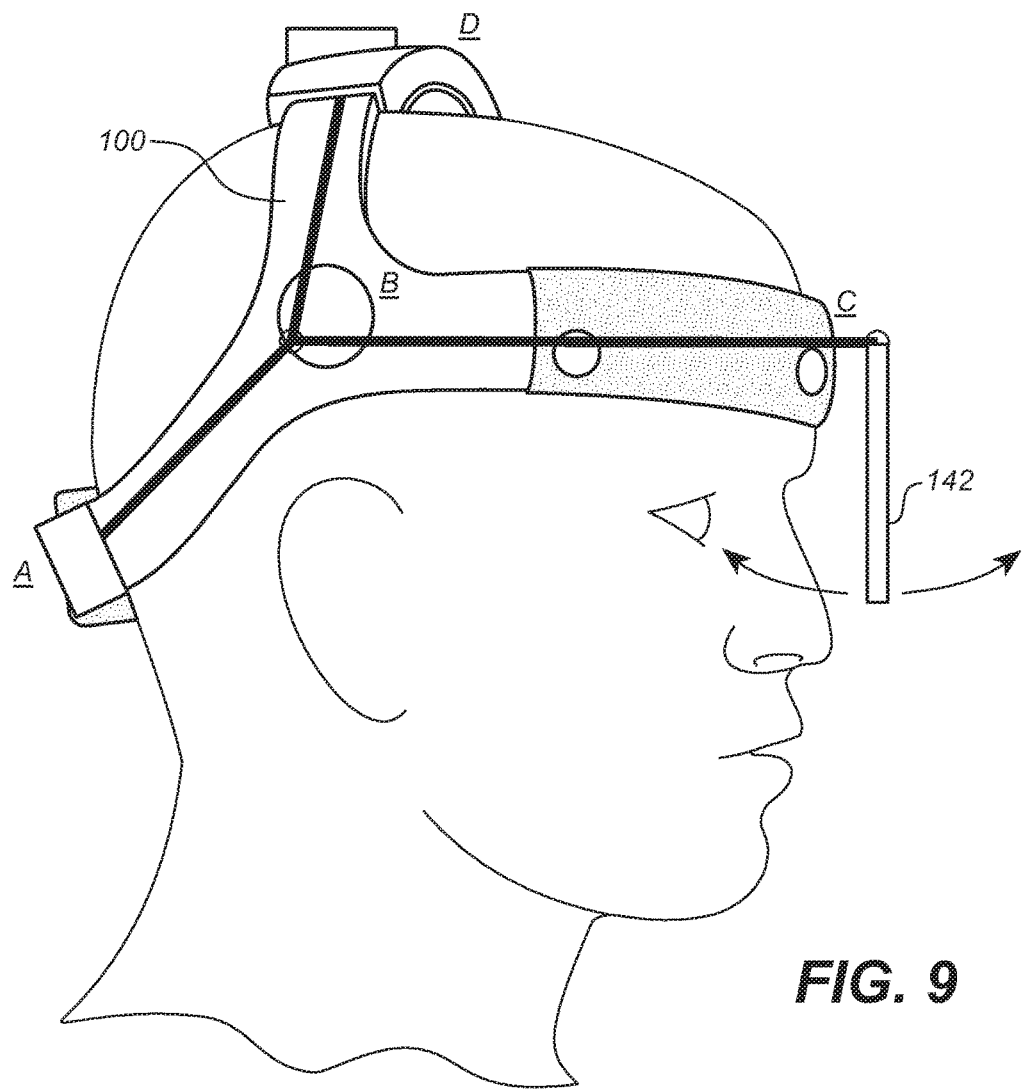
FIG. 9 is the same view showing the various orientations of the display screen relative to the user's eye.

FIG. 9 illustrates the various orientations of the display screen relative to the user's eye. Screen orientation may or may not be generally perpendicular to eye's line of sight. To reduce eyestrain and outside visual distractions a view at a slightly downward angle may be preferred.

Figure 10:
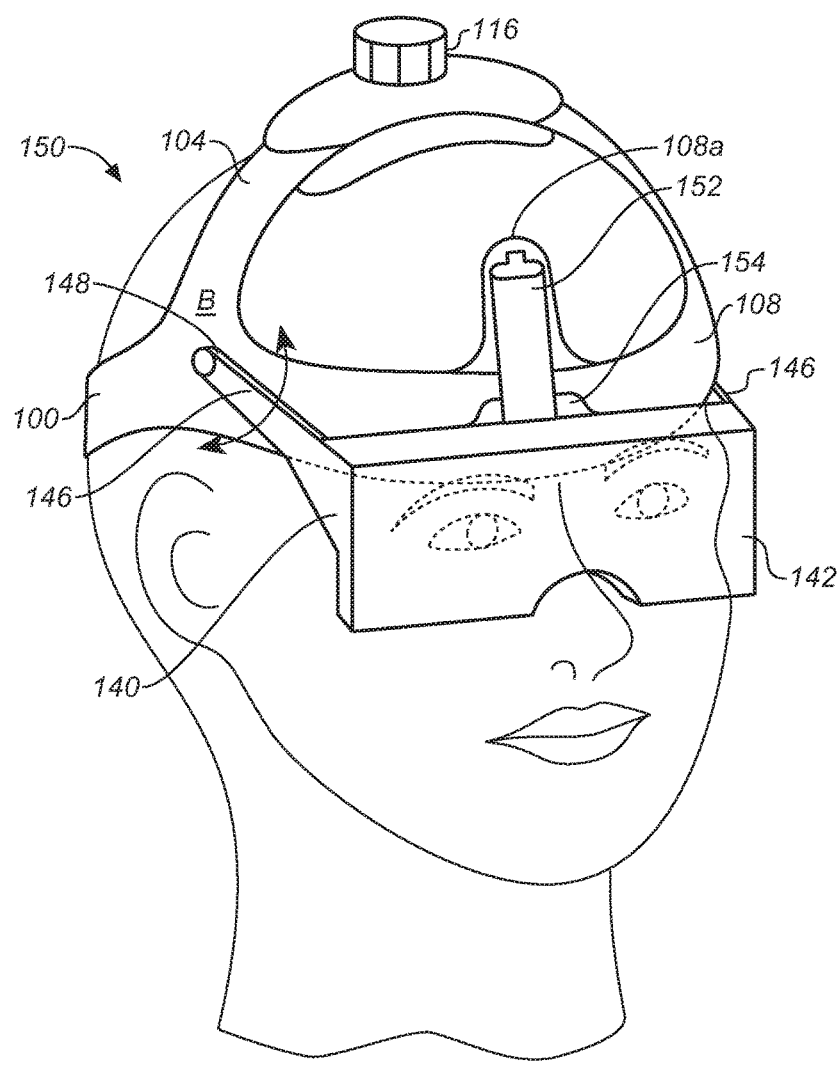
FIG. 10 is an upper front right perspective view illustrating an embodiment of the inventive head mounted display for use in connection with a surgical stereoscopic visualization system, the embodiment using a vertically oriented slide or guide track.
Figure 10A:
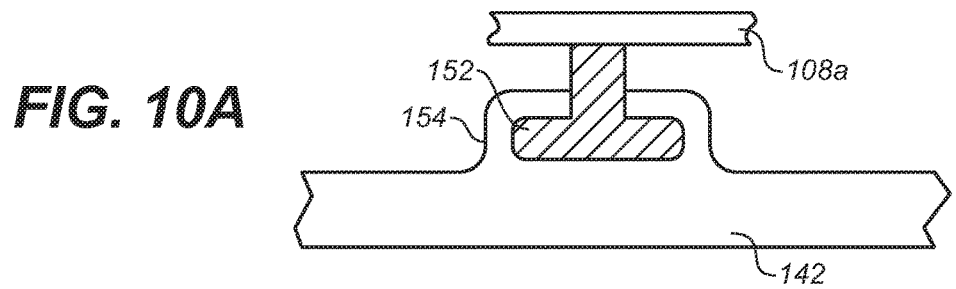
FIG. 10A is a detailed top plan view of the guide track of FIG. 10.

FIG. 10 illustrates an embodiment 150 of the movable head mounted display used in the inventive stereoscopic visualization system, configuration that includes a headband assembly 100, a head mounted display 140, having a display screen 142, side support structures (or temples) 146, a pivot point B located at the temple tips 148, and a T-shaped guide track 152 mounted on the forehead band 108 and extending vertically upward on a vertically oriented tab 108a integral with the forehead band on the front of the headband assembly. The head mounted display 140 includes a T-shaped slot 154 that accommodates the guide track 152 and controls the path of the display screen assembly as it is manually raised and lowered. FIG. 10A is a detailed top plan view of the T-shaped guide track and T-shaped slot 154.

Figure 11:
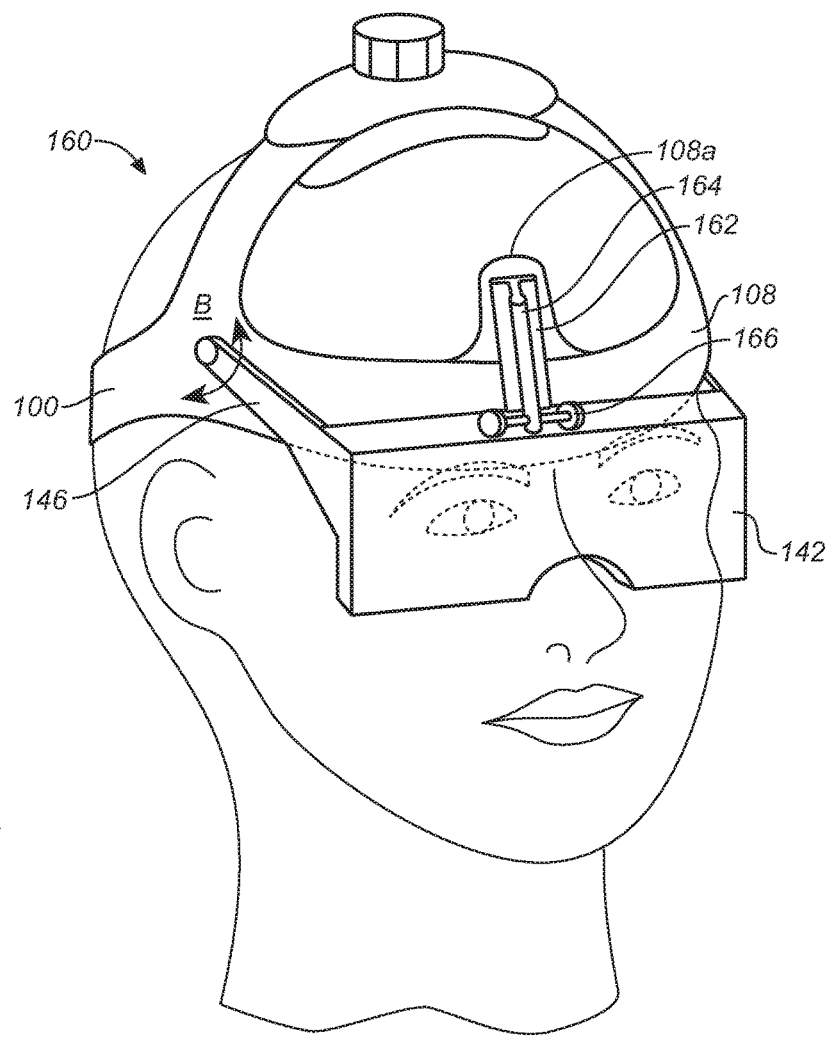
FIG. 11 is an upper front right perspective view showing an alternative embodiment of the inventive head mounted display, employing a connection point to capture and lock the display screen assembly in a raised position.
Figure 11A:
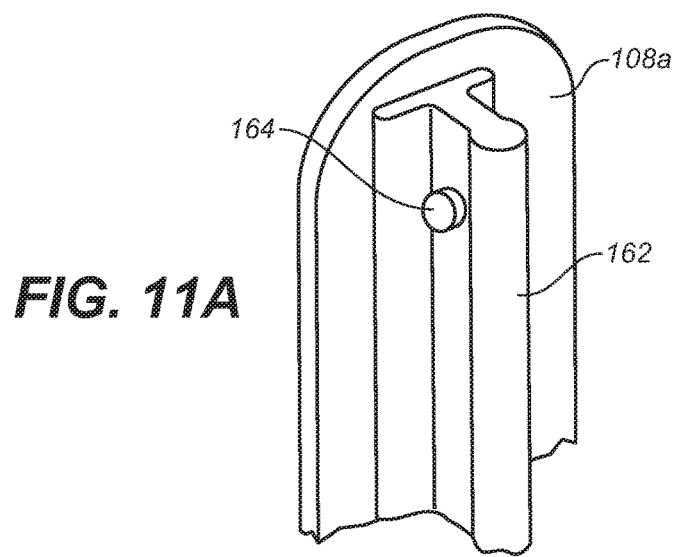
FIG. 11A is a detailed top plan view showing the slide track and connection point.

FIG. 11 and detailed view FIG. 11A show an embodiment 160 having an operational configuration that includes a headband assembly 100, a display screen 142, temples 146, a pivot point B at the temple tips 148, an I-shaped track 162, and an upper connection point 164 to capture and lock the display screen assembly via a spring actuator clip mechanism 166.

Figure 12:
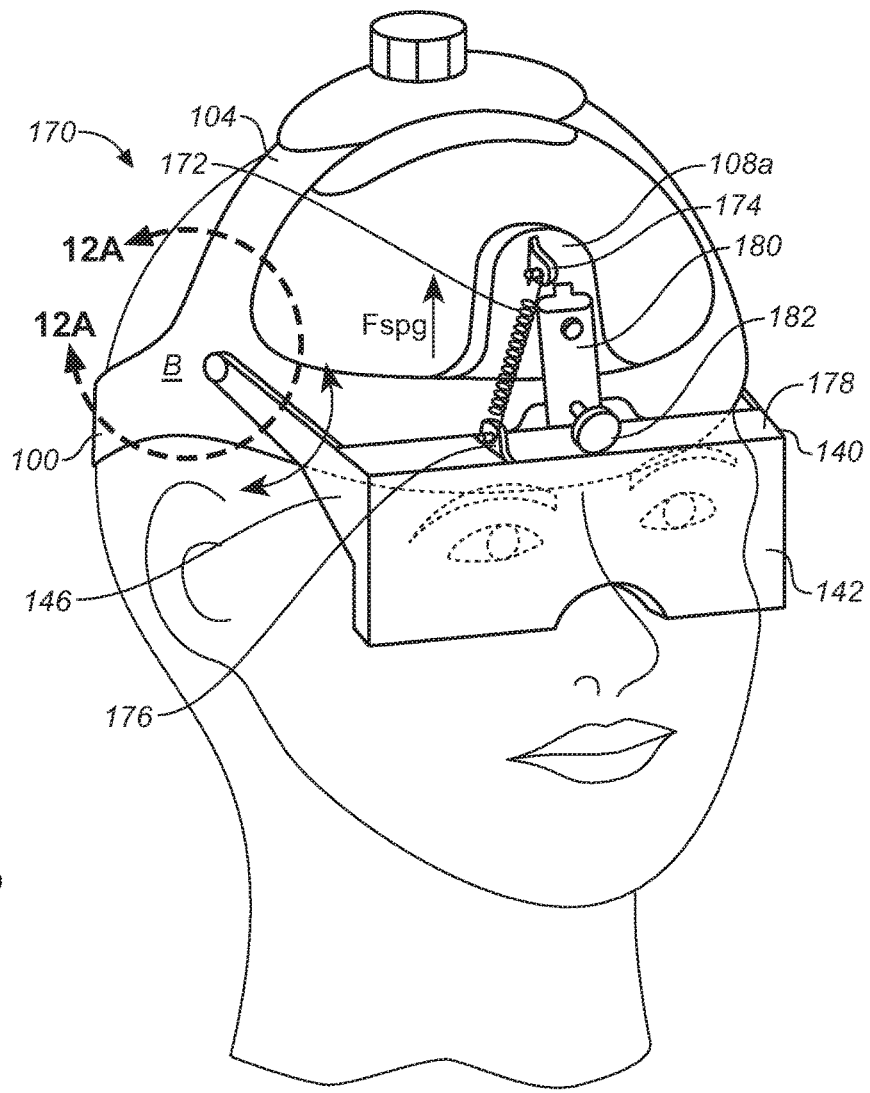
FIG. 12 is an upper front right perspective view showing yet another embodiment of the head mounted display, this iteration using spring actuator for moving the display screen.
Figure 12A:
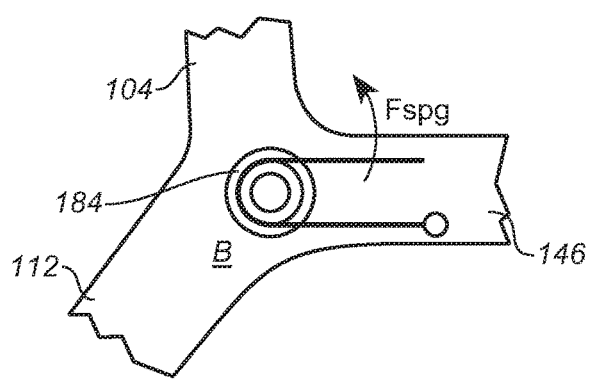
FIG. 12A is a detailed side view in elevation taken along section line 12A-12A of FIG. 12.

FIG. 12 and detailed view FIG. 12A show yet another embodiment 170 of the movable head mounted display for use with the inventive visualization system. This embodiment employs a helical return spring 172, connected to anchors 174, 176 on tab 108a and the upper edge 178 of the display screen 144. A T-shaped guide track 180 is again employed in the manner described with respect to the embodiment shown in FIGS. 10 and 10A. To use this embodiment, the operator releases the spring actuator clip mechanism 182 by pulling, pushing, or squeezing it to allow movement of the display screen 142 to the upper end of the T-shaped guide track with the aid of the spring. When the operator requires repositioning the screen in front of their eyes, they grasp and pull the screen back down into its locked position on the lower end of the track. FIG. 12A shows a return spring 184 that may be located at pivot B.

Figure 13:
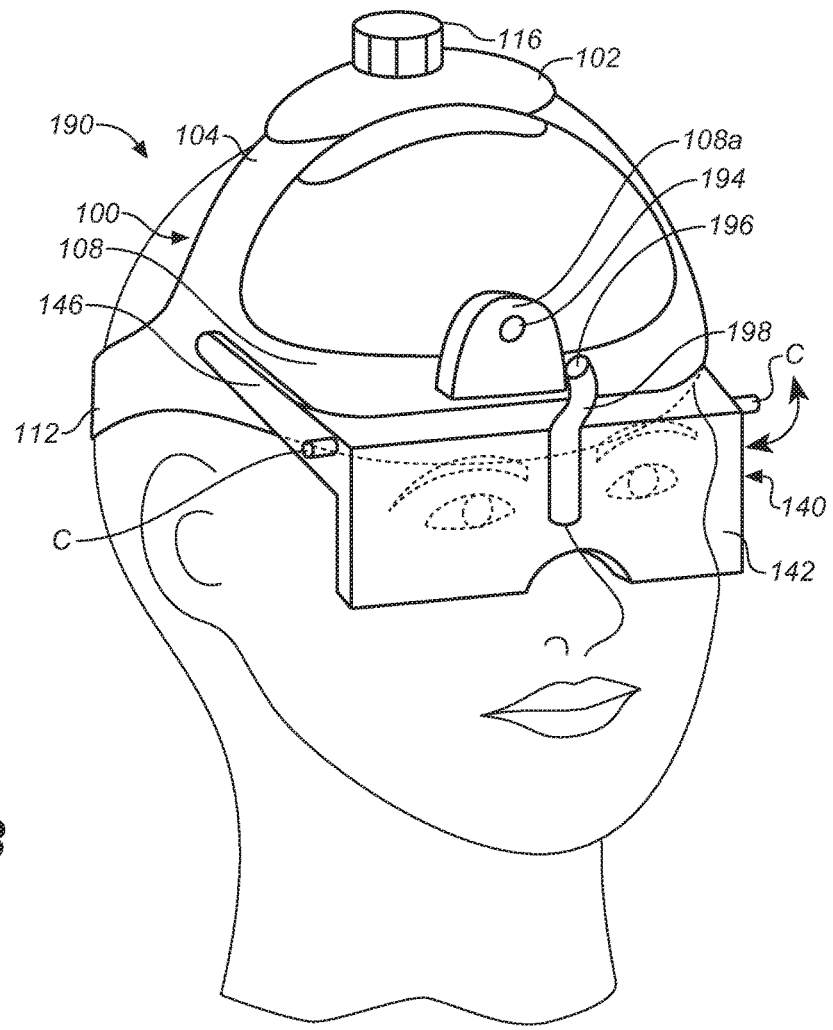
FIG. 13 is an upper front right perspective view showing a still further embodiment of the movable display screen mounted on a headband assembly, this iteration manually movable pivotally and utilizing magnets to secure the display in a raised configuration.
Figure 13A:
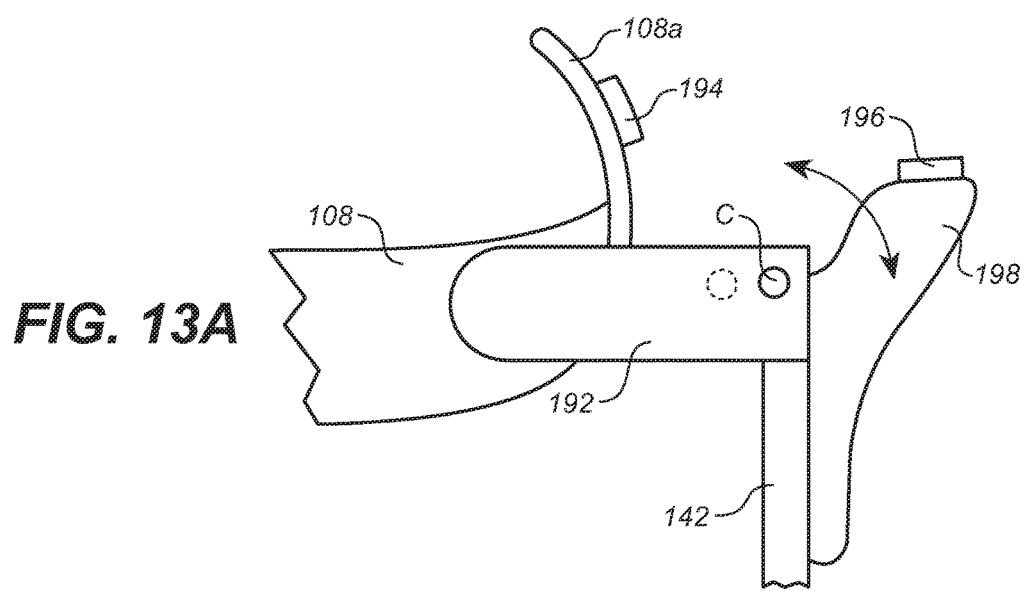
FIG. 13A is a side view in elevation showing details of the pivoting mechanic and magnetic assembly for moving and securing the movable display.

FIG. 13 is another embodiment 190 showing a head mounted display 140 having a display screen 142 mounted on the headband assembly 100. The figure illustrates display screen 142 pivotally mounted to mounting brackets 192 secured to the forehead band 108 of the headband assembly 100. The display screen may be manually rotated CCW/CW about pivot point C and secured in the raised position by a first magnet 194 on the vertical tab 108a magnetically coupling to a second magnet 196 on bar 198 disposed atop the display screen. The user releases the display screen from the raised position simply by pulling it back down into position. Additional magnets may be used to secure it in the lowered position. FIG. 13A is a side view in elevation thereof.

Figure 14A:
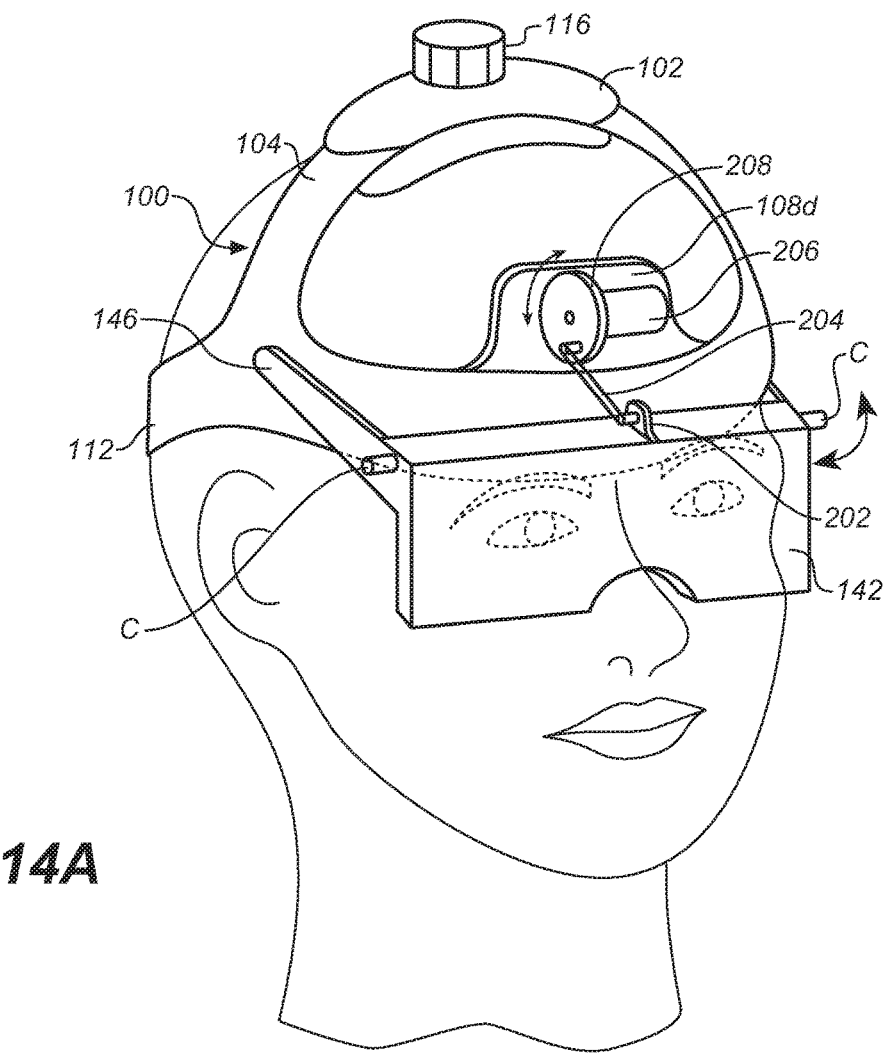
FIG. 14A is an upper front right perspective view showing a still further embodiment of a display screen mounted on a headband assembly, this incorporating an electromechanically actuated movement mechanism for rotating the display screen.

FIG. 14A shows another embodiment 200 having a headband assembly 100, a display screen 142 mounted on the headband assembly, and a motor mounted on tab 108a for rotating the display screen 142 CCW/CW at pivot point C. A lever ridge 202 mounted atop the display screen 142 is connected by a linkage 204 to a motor 206 through linkage disk or pulley 208. The motor 206 rotates to raise or lower the display screen 142 and is mounted on the vertical tab 108a of the forehead band 108 of the headband assembly 100.

Figure 14B:
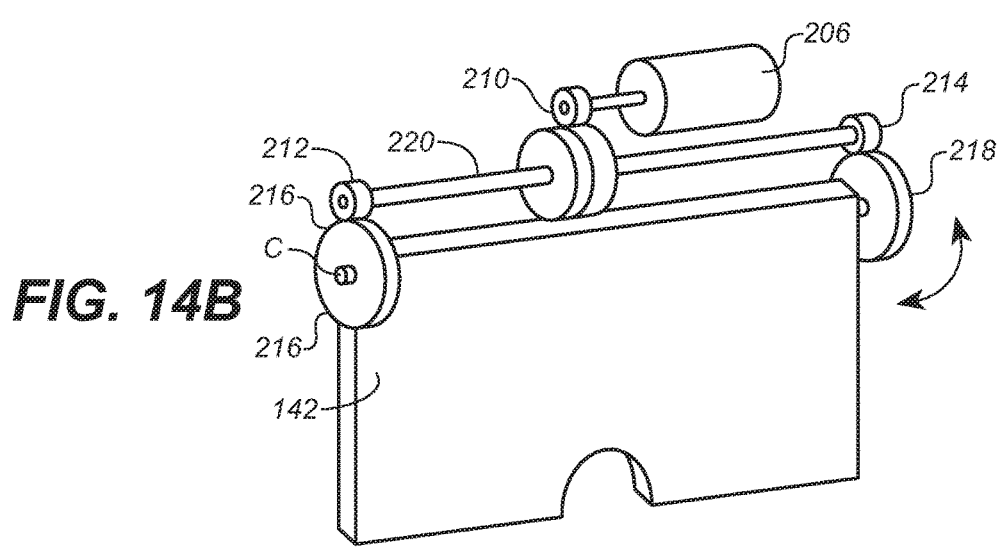
FIG. 14B is an upper front right perspective view of an alternative electromechanical mechanism for pivotally moving the display screen into its raised and lowered positions.

There are many alternative mechanical methods to accomplish this motion, one illustrated in FIG. 14B, which shows a gear train having a constellation of operatively coupled motor driven gears or pulleys 210, 212, 214, 216, 218, and gear shafts 220 which rotate display screen 142 about pivot point C.

Figure 15:
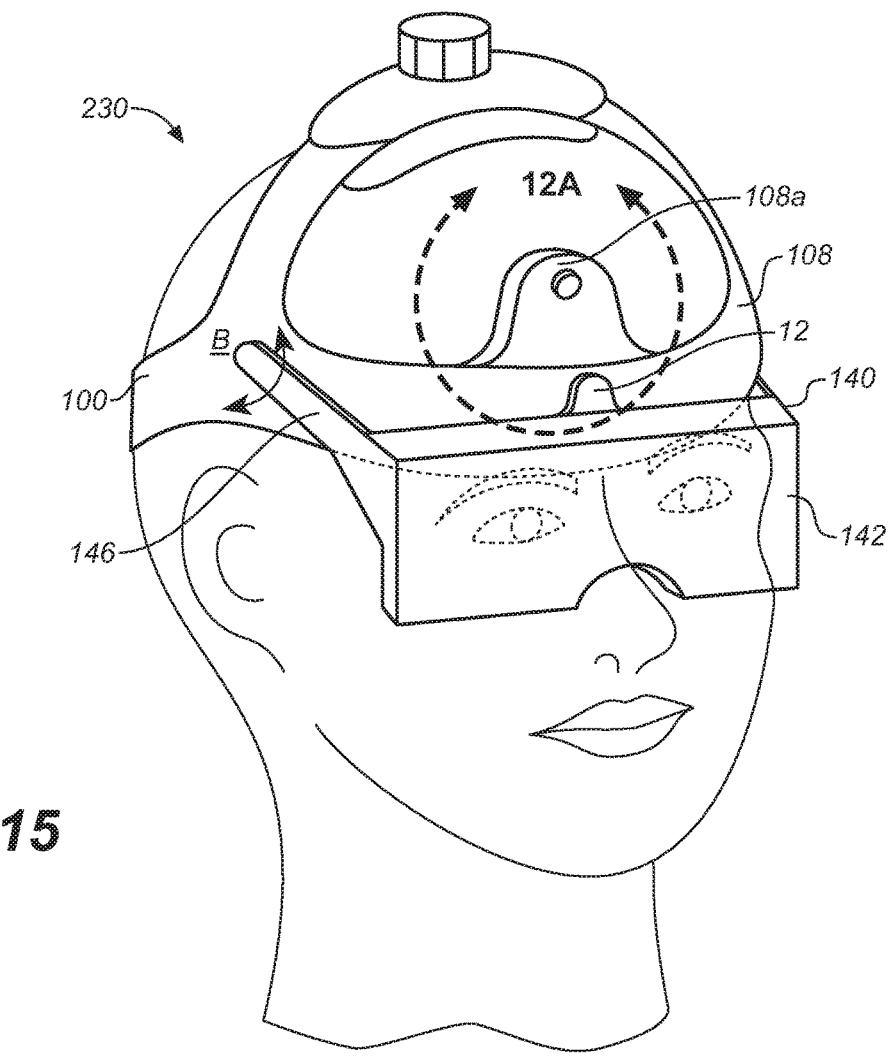
FIG. 15 is an upper front right perspective view showing yet another embodiment of a magnetic assembly for mechanically pivoting the display screen into a raised position and securing it there.
Figure 15A:
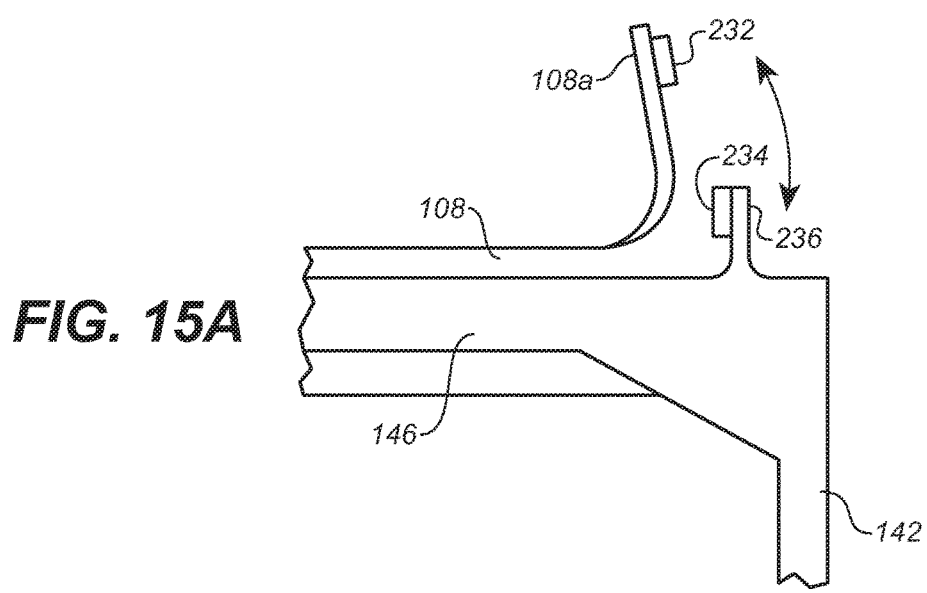
FIG. 15A is a side view in elevation of the mechanism of FIG. 15 taken along section line 15A-15A.

FIG. 15 is an embodiment 230 in which the head mounted display manually pivots at pivot point B and uses magnets 232, 234, to secure the display screen in a raised position. The user releases it by pulling it back down into position. Additional magnets may be employed to secure it in the lowered position. The addition of a mid-temple hinge point may enable additional clearance of facial features during screen motion. FIG. 15A is a side view in elevation thereof.

FIG. 16 is shows the head mounted display and head band assembly configured for motorized movement as actuated by the systems shown in FIGS. 16A and 16B. FIG. 16A illustrates an electromechanical embodiment 240 which raises or lowers the display screen 142 as temples 146 rotate CCW/CW about pivot point B. A cable 242 spooled on a winch drum 244 driven by motor 246 raise or lower the display screen 142. Cable 242 is connected to tab 108a at an anchor point 248. An optional return spring as earlier described may be incorporated at pivot point B (as shown in FIG. 15) to provide constant cable tension. FIG. 16B illustrates an electromechanical embodiment 250 for raising or lowering the display screen 142 as temples rotate CCW/CW around pivot point B. A rack 252 is attached to tab 108a on the forehead band 108 of the headband assembly 100 and engages with a pinion gear 254 attached to motor 256 while constrained by the sliding rack arm 258 to follow the rack 21 during motor 14 rotation and raise or lower the display screen 4.

Figure 17:
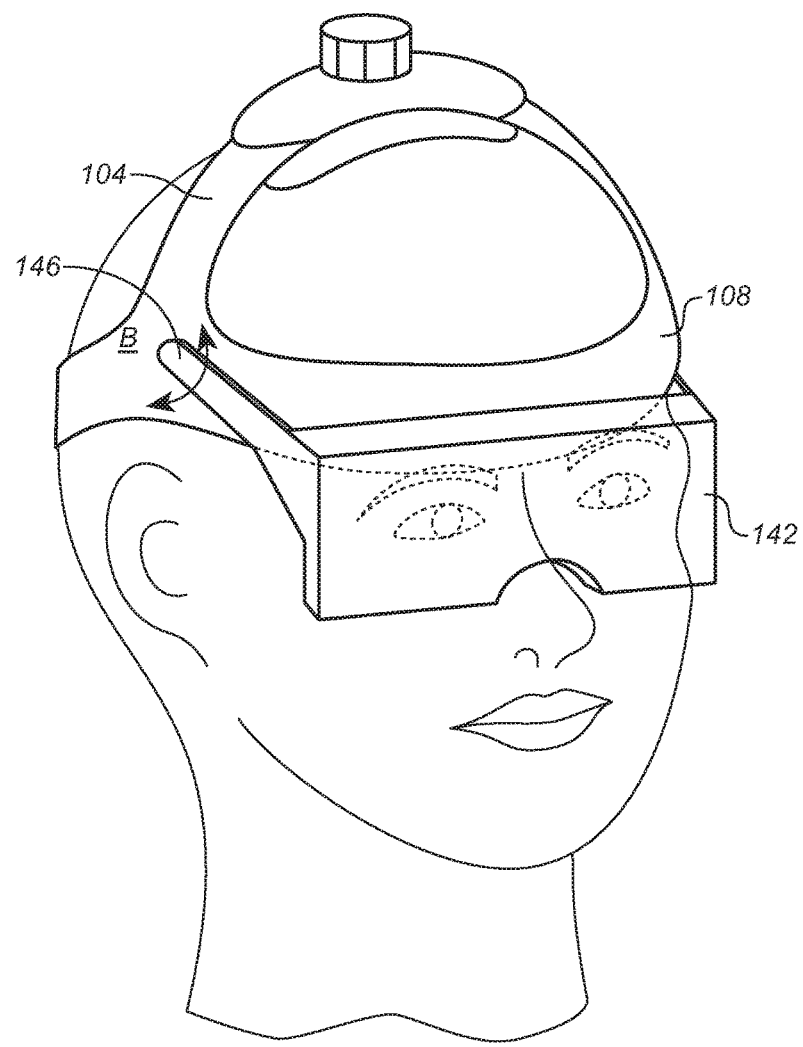
FIG. 17 is an upper front right perspective view again showing how the temples and display screen may be pivotally moved CW and CCW about a pivot point at the temple tips.
Figure 17A:
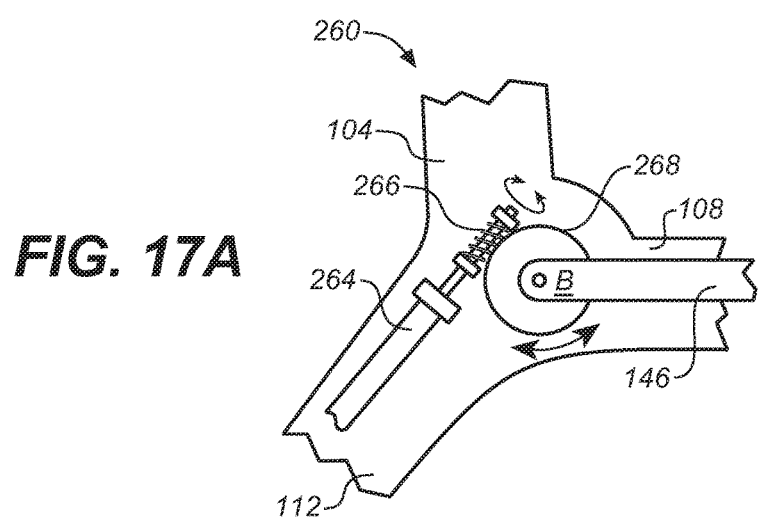
FIG. 17A is an upper right front perspective view showing single or dual flexible drive shaft(s) engaging a worm gear and pivot gear to rotate the side support structure (i.e., the temples) and the display screen around the temple tip pivot point B.

FIG. 17 again shows the headband assembly and head mounted display configured for motorized pivotal movement about pivot point B. FIG. 17A illustrates an embodiment configured with either one or two motors 262 mounted on the headband assembly 100 and single or dual flexible drive shaft(s) 264, worm gear 266 and pivot gear 268 to rotate the side support structure (temples) 146 CCW/CW around pivot point B. Motor and gear assemblies may be disposed on only one side of the headband assembly or on both sides.

Figure 18:
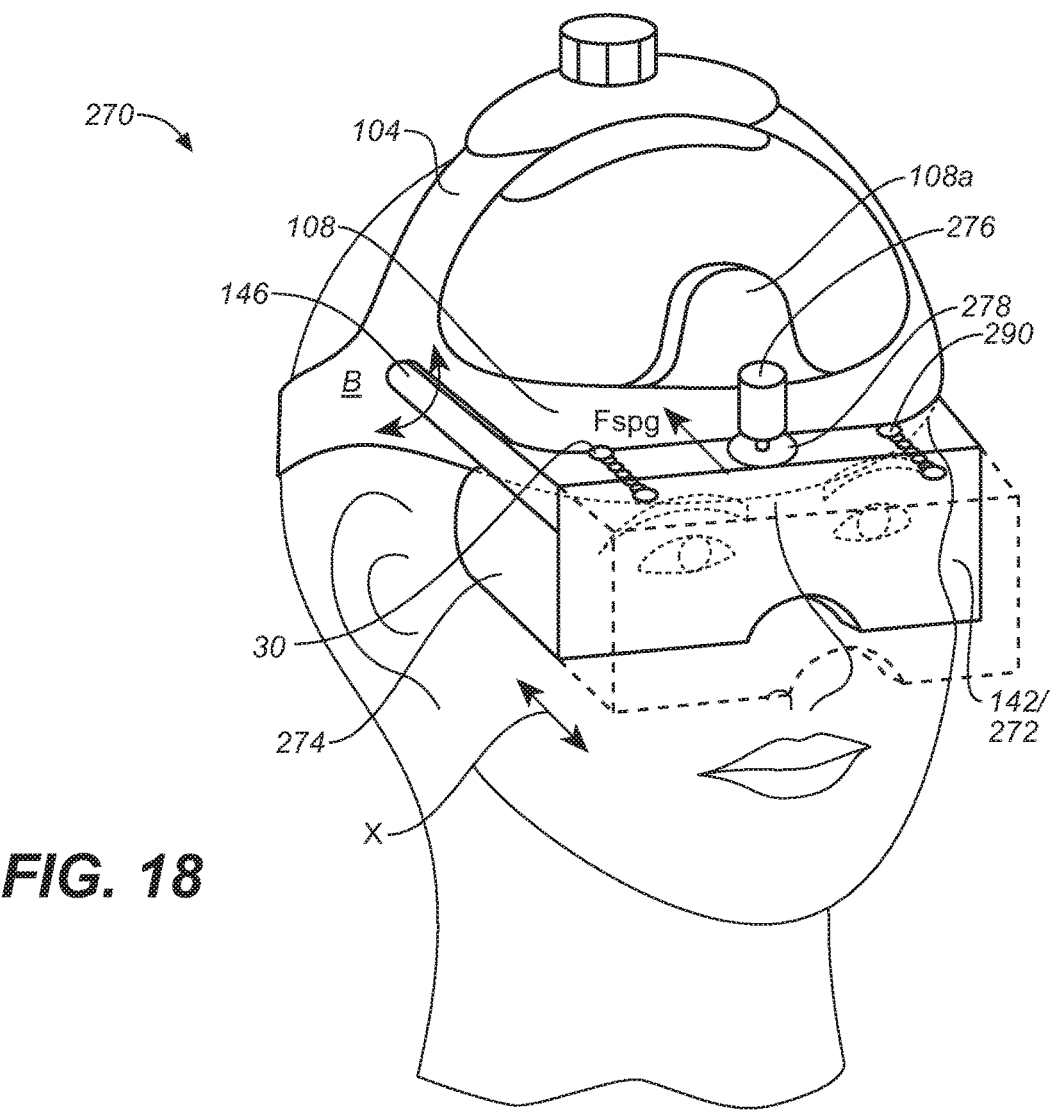
FIG. 18 is an upper front right perspective view again showing how the temples and display screen may be pivotally moved CW and CCW at the temple tips using a display screen mounted on a sliding carriage moving in relation to the temples along an x-axis and the temples and display screen pivotally rotate about the temple tip pivot point.

FIG. 18 is an embodiment 270 wherein the display screen 142 is mounted on a sliding carriage 272 that moves relative to the temples 146 along the x-axis, and the entire assembly rotates around pivot point B, as described in previous figures. The linear motion of the sliding carriage 272 in the positive x-axis direction allows the utilization of an immersive type facial gasket 274 attached to the display screen, and it is set into motion with a motor 276 with attached cam 278 to move the sliding carriage 272 relative to the temples 146 with opposing return springs 290. Raising the display screen 142 is accomplished in two steps: moving the display screen 142 in the positive x-axis direction and then raising the display screen around pivot point B as previously described. Lowering the display screen is the reversal of these two steps.

Figure 19:
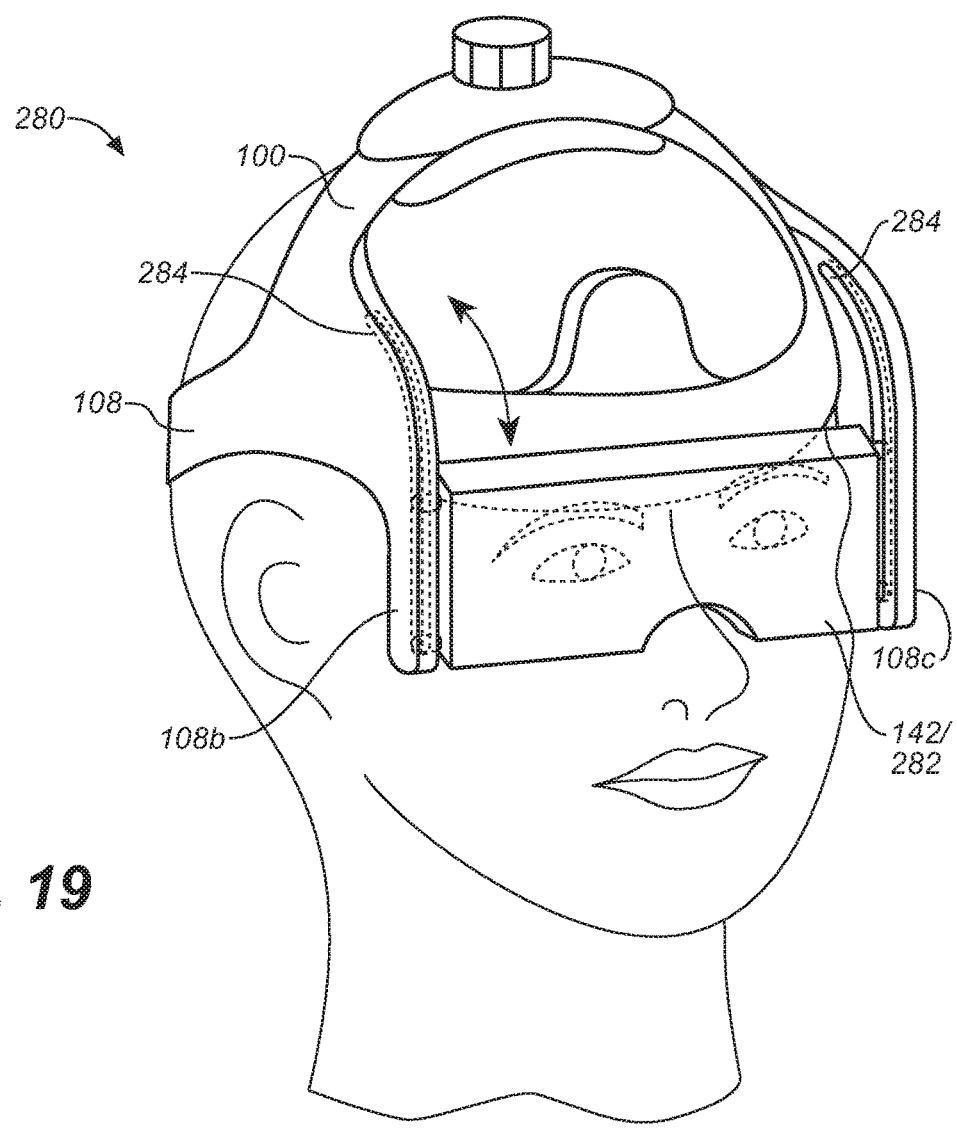
FIG. 19 is an upper right front perspective view of still another embodiment showing display screen movement on a moving carriage having a carriage track on the headband assembly, wherein movement is actuated using any of a number of suitable electromechanical means as earlier shown.

FIG. 19 is an embodiment 280 in which the display screen 142 is mounted on a moving carriage 282, wherein a carriage track 284 is incorporated onto the forward edges of right and left downward extensions 108b, 108c of the forehead band 108 of the headband assembly 100. The display screen 142 follows the path of the carriage track 284 using any of the previously described electromechanical methods.

Figure 20:
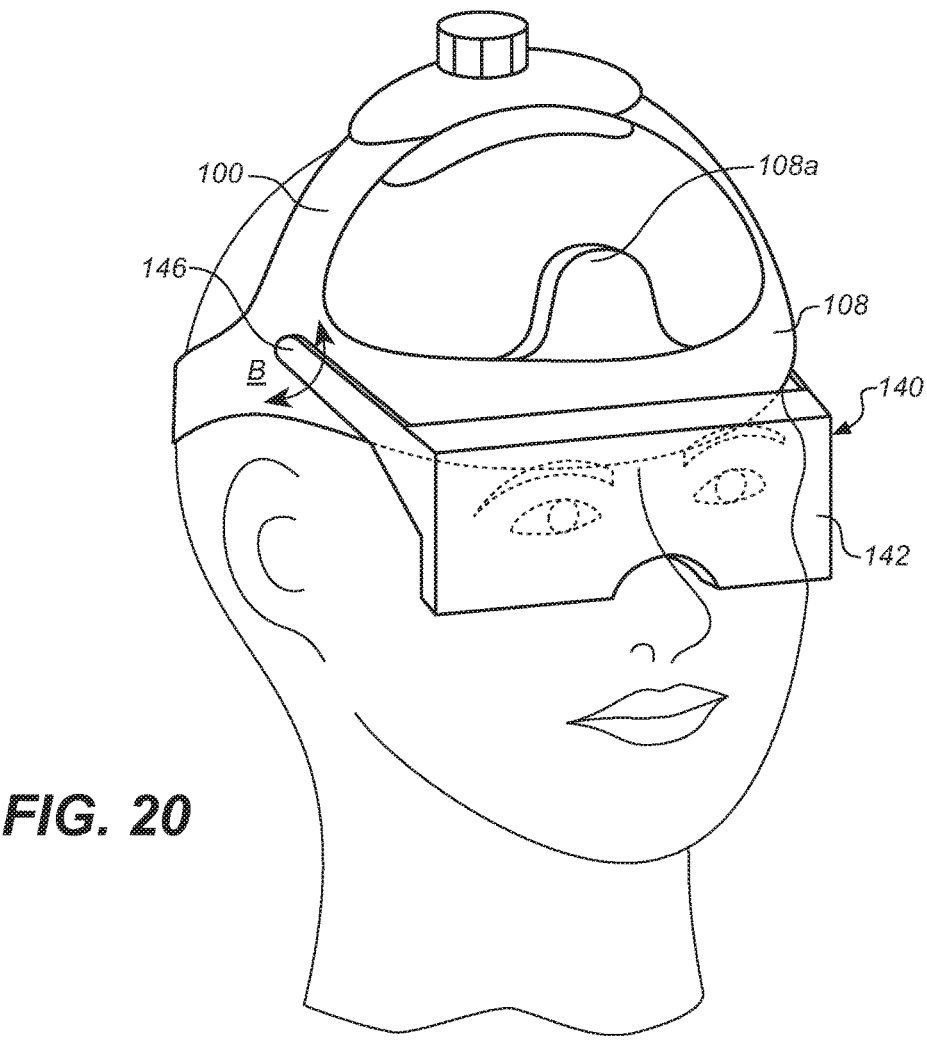
FIG. 20 is an upper front right perspective view again showing a modified headband configured to mount various electromechanical means for pivotally moving the temples and display screen CCW and CW around pivot points at the temple tips, as shown in FIGS. 16A and 16B, wherein the head mounted display pivots at the temple tips.
Figure 20A:
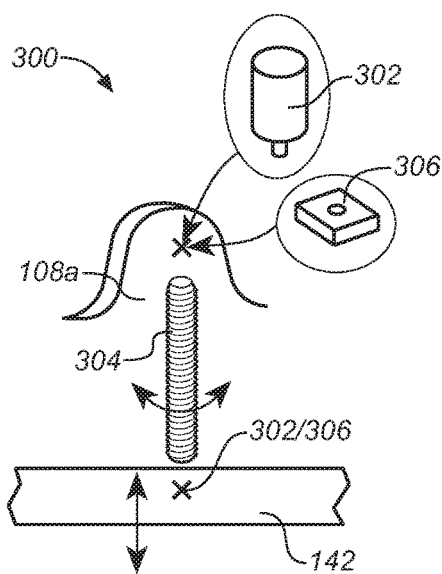
FIG. 20A is the same view showing electromechanical means for pivoting the display assembly about the temple tip pivot points using motor rotating a threaded shaft through a constrained nut.

FIG. 20 shows a configuration of the headband assembly 100 and head mounted display 140 suited for use with several related methods of motion. FIG. 20A illustrates one such method and embodiment 300, viz., an electromechanical assembly of raising or lowering the display screen 142 as temples 146 rotate CCW/CW about pivot point B. A motor 302 is mounted on either the vertical tab 108a of the forehead band 108 of the headband assembly 110 or the display screen 142 and rotates a threaded shaft 304, threading the shaft through the constrained nut 306 at the opposing end of the shaft to raise or lower the display screen.

Figure 20B:
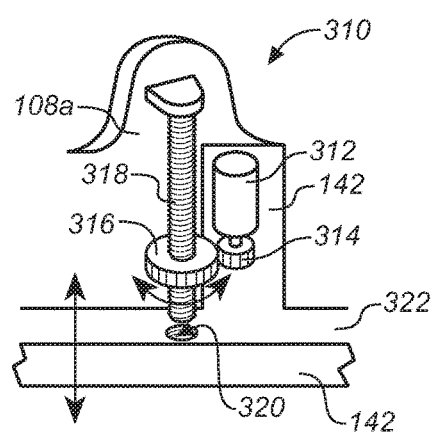
FIG. 20B is the same view showing a motor and pinion gear assembly rotating an internally threaded gear to advance on a constrained threaded shaft passing through a hole in the display screen.

FIG. 20B illustrates another embodiment 310, this using a motor 312 with a pinion gear 314 mounted on the display screen 142 which rotates an internally threaded gear 316, which advances on the constrained threaded shaft 318 while the threaded shaft passes through a hole 320 in the upper portion 322 of the display screen. An alternative method of rotating an internally threaded gear 316 on the constrained threaded shaft 318 is to utilize a belt driven gear (with threaded center hole) and appropriate constraints.

Figure 21:
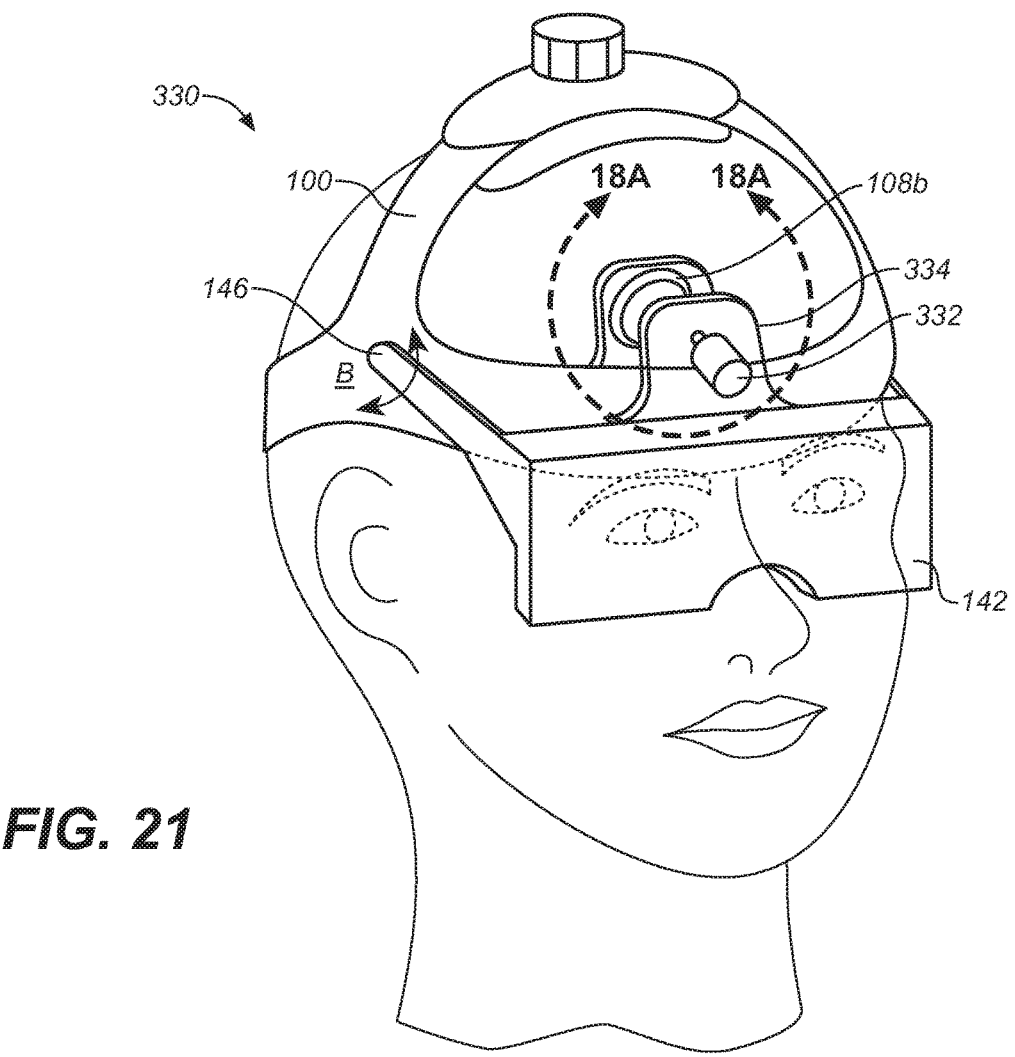
FIG. 21 is an upper right front perspective view illustrating yet another electromechanical method of pivotally raising or lowering the display screen about temple tip pivot points.
Figure 21A:
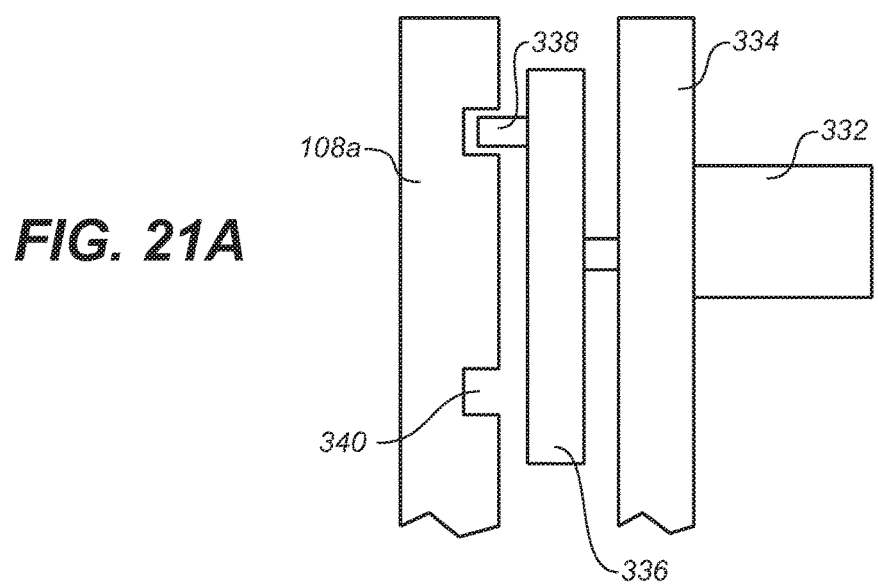
FIG. 21A is a detailed perspective view taken along section line 21A-21A of FIG. 21.

FIG. 21 shows yet another embodiment 330 of an electromechanical system of raising or lowering the display screen 142 as temples 146 rotate CCW/CW about pivot point B. A motor 332 is mounted to a tab 334 extending vertical up from the upper portion of the display screen 142 and rotates a motor disk 336 with a bearing pin 338 that follows a groove 340 in the vertical tab 108a of the forehead band 108 of the headband assembly 110. As the motor 332 and motor disk 336 rotates, the display screen 142 is raised and lowered depending upon the position of the bearing pin 338 within the groove 340. FIG. 21A is a cross-sectional side view in elevation thereof.

Figure 22:
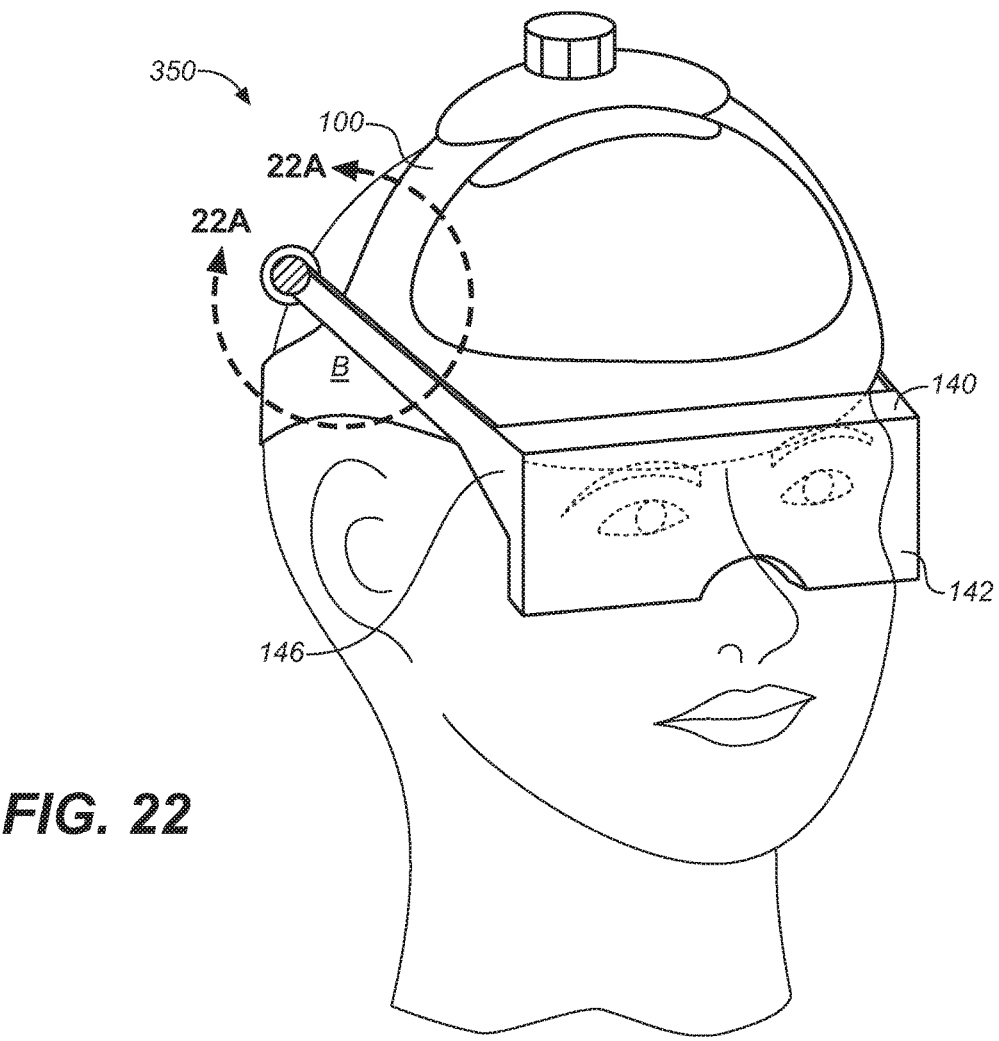
FIG. 22 is an upper right front perspective view showing the headband and display screen configuration for counterbalancing the weight of the display screen to reduce user fatigue and disorientation during user head movement.
Figure 22A:
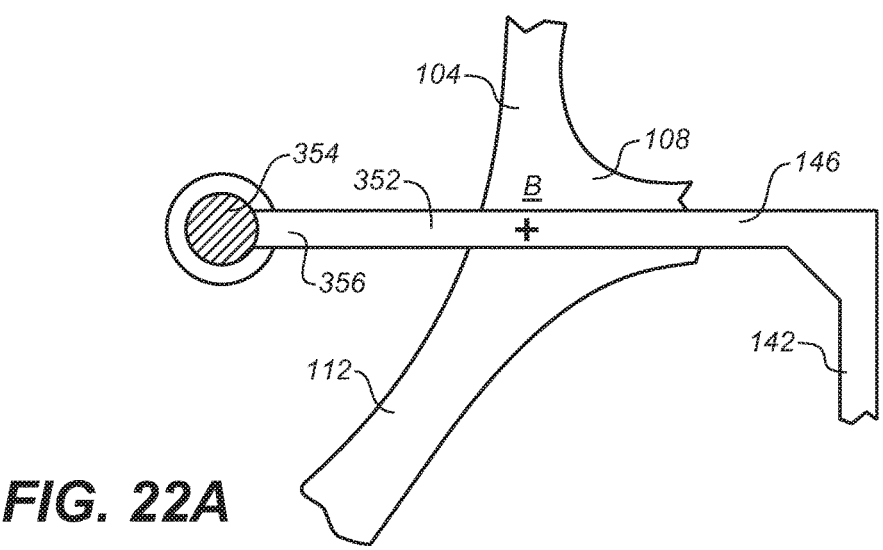
FIG. 22A is a side view in elevation showing an embodiment of a counterbalancing configuration that includes a counterbalance arm and counterbalance weight that projects rearward of the pivot points and the temple tips.

FIG. 22 shows an embodiment 350 in which the weight of the display screen 142 is counterbalanced to reduce user fatigue and disorientation during user head movement. One configuration includes a counterbalance arm 352 integral with temple 146, wherein the continual stem 146/352 is pivotally connected at pivot point B to headband assembly conjunction of top band 104, rear head band 112, and forehead band 108, and extends rearwardly from pivot point B. Counterbalance arm includes a counterbalance weight 354 proximate its end 356 to provide the greatest moment arm. The counterbalance arm may be but need not be in alignment with the temple 146 to balance weight of the display screen 142. Another possible configuration includes a counterbalance weight that opposes the display screen 142 as in FIG. 22 and translates along a similar track system at the rear of the headband assembly 100. In either configuration, the counterbalance weight may be provided by any of the electromechanical components not directly responsible for creating motion, such as a PLC, integrated circuit boards, batteries, etc., instead of a dedicated additional weight.

FIGS. 23A through 23C show embodiments 370 and 380 for individual fitting. The length of telescoping adjustable side support structures (temples) 372, 382 may be accomplished using a threaded screw 372, which makes the HMD adaptable for use by multiple users. An alternative method includes the use of a well-known internal nipple and hole mechanism 382 attached to the internal strut 384 that interlocks with the side support strut 386.

The inventive system allows the stereoscopic microscope head to be optimally positioned for surgical viewing irrespective of the physical position of the surgeon or the surgeon's assistant. Physically decoupling the surgeon and assistant from the surgical microscope ensures a constant stereoscopic image that allows the surgeon and assistant to view the surgical area in a comfortable, head neutral position. Using a head mounted stereoscopic display further ensures that each viewer is always provided with a properly aligned and focused stereoscopic video image.

The industrial applicability is not limited to use in the surgical suite. Hands-free distortion-free magnified stereoscopic viewing to maintain the ability to conduct complicated bi-manual procedures is desirable and even necessary in several manufacturing industries. The present invention may also be used in educational environments where multiple stereoscopic viewers are required.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A surgical stereoscopic visualization system, comprising:
   a stereoscopic microscope head having optical elements providing a magnification, a distortion correction, focusing mechanisms, and optical ports for visualization of an operative field;
   spaced apart dual high speed, high resolution cameras mounted on or proximate said stereoscopic microscope head for a real time video capturing of a subject in an operative field;
   a real time video processing and display system for receiving and processing high resolution video streams from said spaced apart dual high speed, high resolution cameras, wherein said real time video processing combines separate video streams from said spaced apart dual high speed, high resolution cameras into a time aligned stereoscopic image; and one or more movable head-mounted, high resolution stereoscopic displays configured for selective viewing of an electronically generated display on stereoscopic display screens in a lowered, magnified viewing configuration which conceals a surgical site from direct view by a user, or in an unmagnified, direct, line-of-sight raised viewing configuration of the surgical site, wherein said movable head-mounted, high resolution stereoscopic displays remain on a user's head when in either a lowered viewing configuration or a raised viewing configuration;

wherein said stereoscopic display screens are configured to allow for either a direct line-of-sight viewing of the surgical site with said stereoscopic display screens in a locked raised position, or alternatively show a magnified stereoscopic display of a surgical display when said stereoscopic display screens are positioned in a locked lowered position using a remote switch; and wherein said movable head-mounted, high resolution stereoscopic displays are configured to be securely affixed to a wearer's head such that said stereoscopic display screens can be placed in raised and lowered locked positions without necessitating readjustment of a head mounted display for a consistent stereoscopic image when said movable head-mounted, high resolution stereoscopic displays are positioned in the locked lowered position.

2. The surgical stereoscopic visualization system of claim 1, wherein said real time video processing includes one or more of reconstruction of a time-aligned stereo image, color calibration, stereoscopic alignment, overlay of visual information to provide an augmented visual reality, either separately or in any combination.

3. The surgical stereoscopic visualization system of claim 1, wherein each of said movable head mounted, high resolution stereoscopic displays comprises a miniature high resolution and high speed display coupled with a near field optical lens assembly.

4. The surgical stereoscopic visualization system of claim 3, wherein each channel of the stereoscopic video stream is displayed on a distinct portion of said movable head-mounted, high resolution stereoscopic display to actualize the stereoscopic visual separation.

5. The surgical stereoscopic visualization system of claim 4, wherein each of said movable head mounted, high resolution stereoscopic displays and said near field optical lens assemblies are configured in a semi-open fashion to facilitate a simultaneous viewing of both magnified and unmagnified visual fields to enhance a hand-eye coordination.

6. A surgical stereoscope visualization system, comprising:

an adjustable headband assembly including an over-the-head band for placement over a top of a wearer's head and a circumcranial band coupled to said over-the-head band and having a forehead portion for placement laterally across a wearer's forehead;

mounting and display adjustment structure disposed on said forehead portion of said circumcranial band;

a stereoscopic visual display adjustably and movably coupled to said mounting and display adjustment structure on said forehead portion of said circumcranial band;

a stereoscopic microscope head including optical elements providing a magnification, a distortion correction, focusing mechanisms and optical ports for visualization of an operative field;

spaced apart dual high speed, high resolution cameras mounted on or proximate said stereoscopic microscope head for a real time video capturing of a magnified image of a subject in an operative field;

a video processing system for receiving and processing high resolution video streams from said spaced apart dual high speed, high resolution cameras, said video processing system coupled to said stereoscopic visual display so as to present a stereoscopic display of magnified and processed images;

an electromechanical adjustment system operatively connected to said stereoscopic visual display system for selectively moving and positively locking said stereoscopic visual display into a position in front of a user's eyes for viewing a surgical site in a magnified aspect, or into a position above and away from the user's eyes, and positively locking said stereoscopic visual display in such a position, so as to provide a direct and unobstructed line-of-sight view of the surgical site for the user; and a remote switch for activating said electromechanical adjustment system.

7. The surgical stereoscope visualization system of claim 6, wherein said electromechanical adjustment system includes motor controls positioned on said adjustable headband.

8. The surgical stereoscope visualization system of claim 6, wherein said electromechanical adjustment system includes motor controls separated from said adjustable headband assembly for placement on or about the user's body.

9. The surgical stereoscope visualization system of claim 6 wherein said electromechanical adjustment system includes motor controls separated from said adjustable headband assembly for placement in a place other than the user's body.

10. The surgical stereoscope visualization system of claim 6, wherein said electromechanical adjustment system includes voice-activated motor controls.

11. The surgical stereoscope visualization system of claim 6, further including a battery power source electrically connected to electronic devices disposed on a movable head mounted display.

12. The surgical stereoscope visualization system of claim 6, further including a lighting system enabling a wearer to work with both hands while said lighting system illuminates articles and things forward of the wearer's face.

* * * * *